United States Patent
Zhao et al.

(10) Patent No.: US 12,521,089 B2
(45) Date of Patent: Jan. 13, 2026

(54) SYSTEMS AND METHODS FOR ON-PERSON WEARABLE ELECTRONIC DEVICES

(71) Applicant: Massachusetts Institute of Technology, Cambridge, MA (US)

(72) Inventors: Xuanhe Zhao, Allston, MA (US); Xiaoyu Chen, Cambridge, MA (US); Chonghe Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 197 days.

(21) Appl. No.: 18/117,738

(22) Filed: Mar. 6, 2023

(65) Prior Publication Data

US 2023/0277159 A1 Sep. 7, 2023

Related U.S. Application Data

(60) Provisional application No. 63/316,828, filed on Mar. 4, 2022.

(51) Int. Cl.
*A61B 8/00* (2006.01)

(52) U.S. Cl.
CPC .......... *A61B 8/4236* (2013.01); *A61B 8/4494* (2013.01); *A61B 2562/12* (2013.01); *A61B 2562/164* (2013.01)

(58) Field of Classification Search
None
See application file for complete search history.

(56) References Cited

U.S. PATENT DOCUMENTS

| | | | |
|---|---|---|---|
| 11,148,389 B2 | 10/2021 | Zhao | |
| 2006/0106310 A1* | 5/2006 | Lo | A61B 8/02 600/459 |
| 2013/0131704 A1* | 5/2013 | Pechoux | A61N 7/02 606/169 |
| 2017/0128042 A1* | 5/2017 | Desai | A61B 8/4281 |
| 2018/0228462 A1* | 8/2018 | Maghsoudnia | H10N 30/302 |
| 2019/0070826 A1* | 3/2019 | Zhao | B32B 27/08 |
| 2019/0328354 A1* | 10/2019 | Xu | B06B 1/0685 |
| 2020/0121281 A1* | 4/2020 | Dagdeviren | A61B 8/4209 |
| 2021/0275141 A1* | 9/2021 | Eckersley | G01S 15/8913 |

FOREIGN PATENT DOCUMENTS

| | | | |
|---|---|---|---|
| CN | 214632194 U | * | 11/2021 |
| JP | H05240944 A | | 9/1993 |
| JP | 2006051105 A | | 2/2006 |
| WO | 2018134364 A2 | | 7/2018 |

OTHER PUBLICATIONS

CN-214632194-U translation (Year: 2021).*
International Search Report in International Application No. PCT/US2023/014598 dated Jul. 5, 2023 (4 pages).
Written Opinion in International Application No. PCT/US2023/014598 dated Jul. 5, 2023 (9 pages).

* cited by examiner

*Primary Examiner* — Christopher Koharski
*Assistant Examiner* — Renee C Langhals
(74) *Attorney, Agent, or Firm* — Quarles & Brady, LLP

(57) ABSTRACT

Systems and methods are provided for on-person wearable electronic devices configured for extended periods of wear. A couplant may be provided that is made of a soft anti-dehydrating, and hydrogel-elastomer hybrid material. A bioadhesive may connect the couplant the electronic devices and the person. The couplant may serve as a coupling and transmission for information to or from the electronic device.

27 Claims, 23 Drawing Sheets

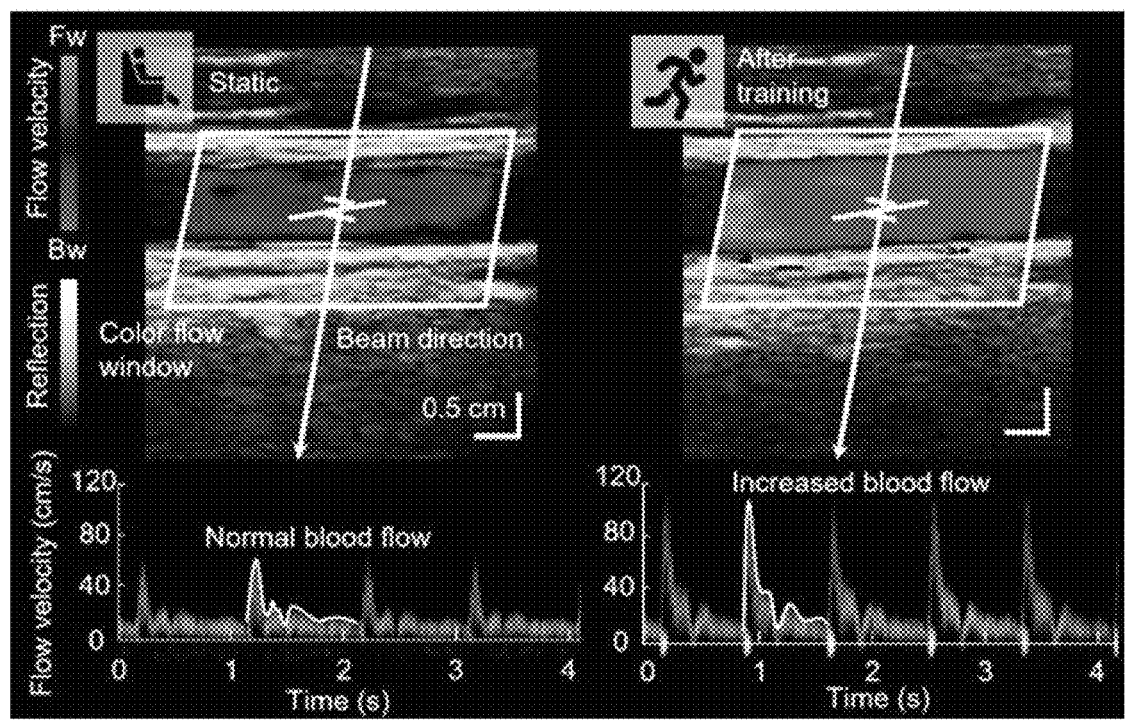
FIG. 10D
FIG. 10E
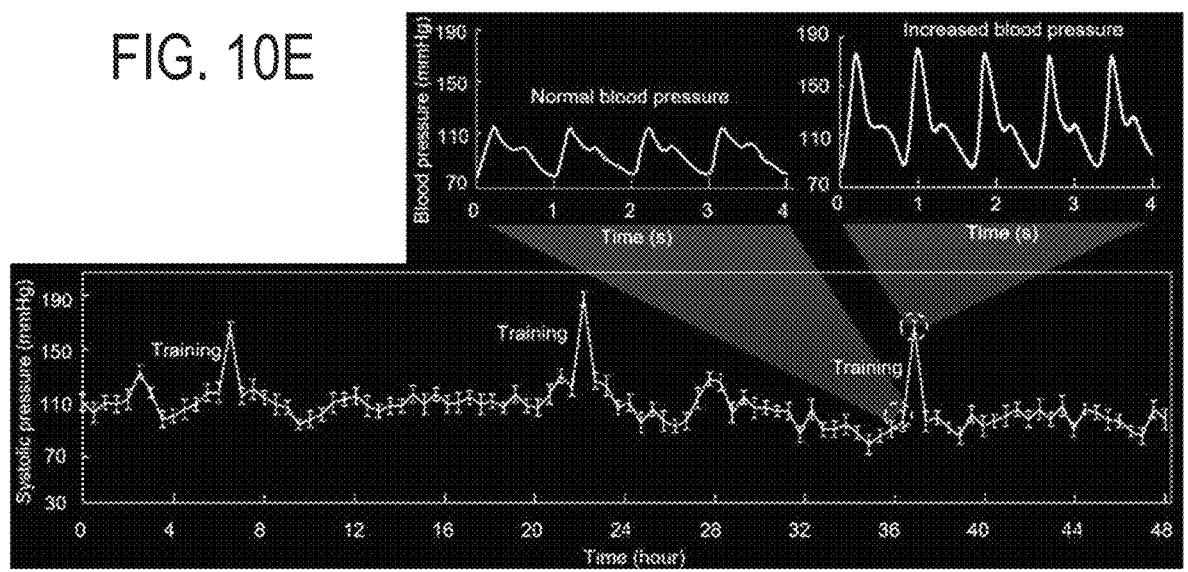
FIG. 10F

SYSTEMS AND METHODS FOR ON-PERSON WEARABLE ELECTRONIC DEVICES

CROSS-REFERENCE TO RELATED APPLICATIONS

This application claims the benefit of priority to U.S. Provisional Patent Application No. 63/316,828, titled "SYSTEMS AND METHODS FOR ON-PERSON WEARABLE ELECTRONIC DEVICES", filed Mar. 4, 2022, the disclosure of which is herein incorporated by reference in its entirety.

STATEMENT REGARDING FEDERALLY SPONSORED RESEARCH

This invention was made with government support under EFMA1935291 awarded by the National Science Foundation, and under HL153857 awarded by the National Institutes of Health. The government has certain rights in the invention.

BACKGROUND

Wearable devices that can continuously monitor human physiology in a non-invasive manner represent a pivotal trend in precision and digital medicine. Particularly, deep-tissue physiology, including organ signals and dynamics, contains crucial information regarding health and diseases. Although current wearable devices have successfully recorded physical and chemical signals from the skin such as electrocardiogram data and sweat metabolites and electrolytes, clinical-grade imaging of various internal organs remains a central task and a challenge in the field of wearable devices. Ultrasound imaging with zero radiation allows clinicians to evaluate tissue and organ functions and diagnose various diseases. If sampled frequently over days to months, ultrasound imaging of internal organs could help clinicians monitor health status, observe disease progression, and assess disease risks; it could also lead to discoveries in and better understanding of developmental biology.

Wearable ultrasound devices have the potential for continuous imaging of internal organs. Conventional wearable ultrasound imaging usually relies on mounting bulky ultrasound probes on the skin by either robotic systems or mechanical fixtures such as straps and tapes, which hamper patients' mobility and wearing convenience and comfort. In addition, conventional wearable ultrasound imaging is only applicable to limited body parts such as muscles because of the thick ultrasound probe and the high pressure exerted by the probe. For example, mechanically mounting a conventional ultrasound probe on the neck to image the carotid artery, jugular vein, and vagus nerve could cause suffocation.

Although stretchable ultrasound imaging devices have improved wearability, they still suffer from limitations, including low imaging resolution, unstable imaging quality during body motions, a short continuous imaging duration (1 hour), and susceptibility to device failure. These limitations mainly stem from the design of the device, which includes piezoelectric elements over a stretchable substrate. Although the stretchable substrate can deform conformally with the skin, it limits the density of elements (156 per square centimeter) and is incompatible with backing and matching layers, leading to a low imaging resolution. In addition, when the substrate deforms with the skin under body motions, the elements' spatial and angular positions vary unpredictably, which hampers the imaging stability of the device. Furthermore, existing wearable ultrasound devices, in both rigid and stretchable form factors, mostly rely on hydrogel or elastomer couplants for acoustic transmission to the skin. However, the hydrogel couplants usually get dehydrated or detached from the skin over a few hours, and the elastomer couplants are too damping to image deep organs.

There are several additional drawbacks to current rigid and stretchable ultrasound imaging devices. First, because acoustic waves are directional, ultrasound probes' positions usually need to be tuned in situ (e.g., by tilting or rotating the probes on patients) to achieve the optimized imaging directions. However, the positions of existing wearable ultrasound probes are fixed on the skin and un-adjustable during applications, severely hampering their imaging performance. For example, stretchable ultrasound probes can only be parallel to the skin that they conform to; the resultant imaging directions are usually unoptimized for imaging internal organs. Second, existing wearable ultrasound imaging devices only have one imaging window, which cannot image multiple far-apart organs simultaneously. However, simultaneous imaging of multi-organ correlations in daily activities could provide critical information for disease diagnosis and monitoring and fundamental biological research.

Thus, there is a need for wearable electronic devices that can be positioned on the person and be worn for an extended period of time to acquire information beyond that which is available from superficial skin monitoring or optical monitoring from a piece of clothing or jewelry. There also remains a need for a system that is comfortable and does not distort the body of the subject in an adverse manner.

SUMMARY OF THE DISCLOSURE

The present disclosure addresses the aforementioned drawbacks by providing systems and methods for securing electronic devices directly on-person in a way that facilitates extended wearing, while properly positioning the electronic device(s) for effective, extended, data gathering. In particular, an elastomer membrane may be utilized and coupled to the electronic device. An electronically-communicable or transmissible material may be arranged within the elastomer membrane. A bioadhesive layer may be coupled to the elastomer membrane on a side opposite to the electronic device and configured to couple the elastomer membrane to the subject.

In one non-limiting example, the wearable electronic device may include a high-resolution wearable ultrasound. In some configurations, a bioadhesive ultrasound (BAUS) device may be used, which includes a thin, rigid, and high-resolution ultrasound probe robustly adhered on the skin via a couplant layer made of a soft, tough, anti-dehydrating, and bioadhesive hydrogel-elastomer hybrid. A thin rigid BAUS probe provides for high transducer density, stable transducer positions under dynamic body motions, high reliability of the probe in long-term applications, and the like. A BAUS probe integrated on BAUS couplant may include a thin rigid ultrasound probe, handheld ultrasound probe, stretchable ultrasound probe, and the like.

In one configuration, a system is provided for extended ultrasound imaging of a subject. The system includes an ultrasound probe formed of a plurality of transducers arranged across a plane. The system also includes an elastomer membrane extending across and coupled to the plane of the ultrasound probe. The system also includes an acoustically transmissible material arranged within the elastomer membrane. The system also includes a bioadhesive layer coupled to the elastomer membrane on a side opposite to the ultrasound probe and configured to couple the elastomer membrane to the subject.

In one configuration a method is provided for forming an extended ultrasound imaging system of a subject. The method includes forming an ultrasound probe with a plurality of transducers arranged across a plane. The method also includes extending an elastomer membrane across and coupled to the plane of the ultrasound probe. The method also includes arranging an acoustically transmissible material within the elastomer membrane and forming a bioadhesive layer coupled to the elastomer membrane on a side opposite to the ultrasound probe and configured to couple the elastomer membrane to the subject.

In one configuration, a system is provided for securing an electronics system to a subject for an extended period. The system includes an electronics substrate forming a plane having at least one electronic circuit formed thereon. The system also includes an elastomer membrane extending across and coupled to the plane of the electronics substrate and a hydrogel arranged within the elastomer membrane. The system also includes a bioadhesive layer coupled to the elastomer membrane on a side opposite to the plane of the electronics substrate and configured to couple the elastomer membrane to the subject.

In one configuration, a system is provided. The system includes an elastomer membrane forming an enclosure about a void. The system also includes a hydrogel arranged within the void and enclosed by the elastomer membrane. The system also includes and a bioadhesive layer coupled to the elastomer membrane to couple the elastomer membrane to the subject.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention. Like reference numerals will be used to refer to like parts from Figure to Figure in the following description.

BRIEF DESCRIPTION OF THE DRAWINGS

FIG. 10D shows color flow imaging of the carotid artery by the non-limiting example wearable ultrasound system. The diameter of the carotid artery and the blood flow rate in the carotid artery increase significantly after 0.5 hour of physical exercise. Scale bar, 0.5 cm.

FIG. 10E shows blood pressure waveforms of the carotid artery before and after 0.5 hour of physical exercise. The systolic blood pressure of the carotid artery increases significantly after 0.5 hour of physical exercise. The drop of the blood pressure from the systolic peak in each cardiac cycle is much steeper after 0.5 hour of physical exercise.

FIG. 10F shows the systolic blood pressure of the carotid artery over 48 hours measured from the wearable ultrasound imaging. The systolic blood pressure is measured by calculated the mean and standard deviation of 15 consecutive systolic peaks every 0.5 hour. Error bars indicating standard deviation (±s.d.) of measured systolic pressure (n=15 independent samples).

DETAILED DESCRIPTION

Figure 1:
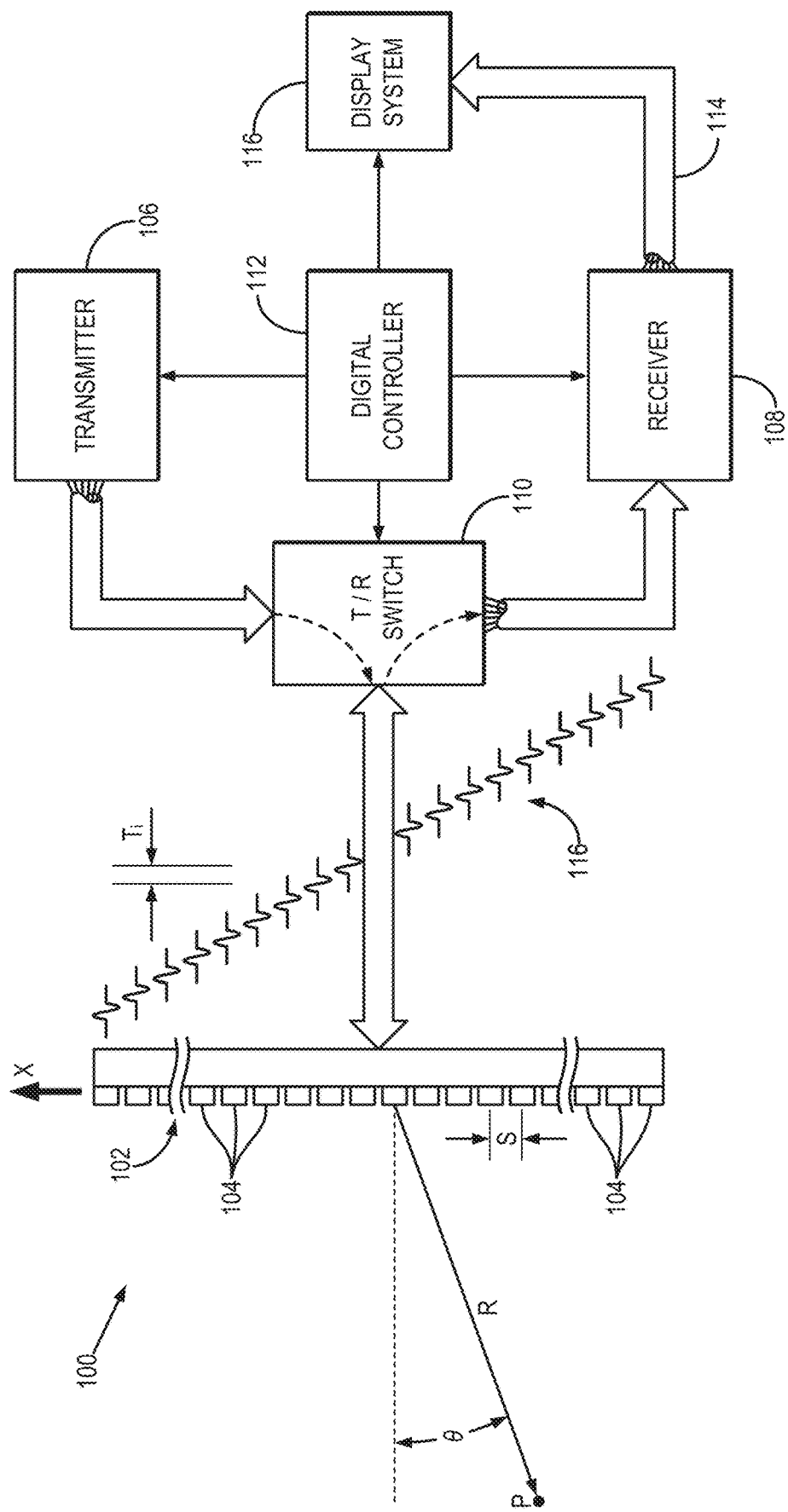
FIG. 1 is a block diagram of a non-limiting example ultrasound system that can implement the methods described in the present disclosure.

The present disclosure provides systems and methods for securing electronic devices directly on-person in a way that facilitates extended wearing, while properly positioning and adjusting the electronic device(s) for effective, extended, data gathering. In particular, an elastomer membrane may be utilized and coupled to the electronic device. An electronically-communicable or transmissible material may be arranged within the elastomer membrane. A bioadhesive layer may be coupled to the elastomer membrane on a side opposite to the electronic device and configured to couple the elastomer membrane to the subject.

In one non-limiting example, the electronic device may be a sensor or monitoring system. In yet one further non-limiting example the electronic device may be an ultrasound transducer or array of ultrasound transducers. Furthermore, the electronic device may include a processor and/or communications components.

High-resolution ultrasound imaging with zero radiation is the handiest tool for clinicians to evaluate tissue and organ functions and diagnose various diseases. High-resolution ultrasound imaging of deep-tissue physiology has proved elusive and existing ultrasound imaging devices, dominantly used by clinicians, are inaccessible to patients for daily continuous imaging and monitoring of deep-tissue physiology.

Conventional wearable ultrasound imaging usually relies on mounting bulky ultrasound probes on the skin by either robotic systems or mechanical fixtures such as straps and tapes, which significantly hamper patients' mobility and wearing convenience and comfort. In addition, conventional wearable ultrasound imaging is only applicable to limited body parts such as muscles due to the thick ultrasound probe and the high pressure exerted by the probe. Furthermore, clothes usually cannot be covered on the thick-profile probe when it is mounted on the skin. For conventional wearable technology, the subject is expected to adapt and conform to the wearable system rather than the other way around.

While some have tried to create stretchable ultrasound devices that have improved wearability, they still suffer from limitations including low imaging resolution (2 mm), unstable imaging quality during body motions, short imaging duration (2 hours), and susceptibility to device failure. These limitations mainly stem from the design of the device, which patterns imaging transducers over a stretchable substrate attached on the skin. While the stretchable substrate can deform conformally with the skin, it substantially limits the transducers' area density (156 per square centimeter) and thus constrains the imaging resolution (2 mm).

In addition, when the substrate deforms with the skin under body motions, the transducers' spatial and angular positions vary unpredictably, which dramatically hampers the imaging stability of the device. Most importantly, existing wearable ultrasound devices, in both rigid bulky and stretchable thin form factors, mostly rely on liquid couplants for acoustic transmission to the skin. However, the liquid couplants can easily flow away under the pressure applied by the probes and/or get dehydrated over a few minutes, limiting the continuous imaging duration of the devices to a few minutes.

As a particular but non-limiting example, systems and methods are provided for high-resolution wearable ultrasound. In some configurations, a bioadhesive ultrasound (BAUS) device may be used, which includes a thin, rigid, and high-resolution ultrasound probe robustly adhered on a subject, such as the skin of a subject, via a couplant layer made of a soft, tough, anti-dehydrating, and bioadhesive hydrogel-elastomer hybrid material. A thin rigid probe provides for high transducer density, stable transducer positions under dynamic body motions, high reliability of the probe in long-term applications, and the like. A probe integrated on couplant may include a thin rigid ultrasound probe, handheld ultrasound probe, stretchable ultrasound probe, and the like.

Referring to FIG. 1, one non-limiting example of an electronic or sensor device in accordance with the present disclosure is provided. In this example, the electronic device is illustrated as an ultrasound system 100 that can implement the methods described in the present disclosure is shown. The ultrasound system 100 includes a transducer array 102 that includes a plurality of separately driven transducer elements 104. The transducer array 102 can include any suitable ultrasound transducer array, including linear arrays, curved arrays, annular array, phased arrays, and so on. Similarly, the transducer array 102 can include a 1D transducer, a 1.5D transducer, a 1.75D transducer, a 2D transducer, a 3D transducer, and so on.

When energized by a transmitter 106, a given transducer element 104 produces a burst of ultrasonic wave. The ultrasonic wave reflected back to the transducer array 102 (e.g., an echo) from the object or subject under study is converted to an electrical signal (e.g., an echo signal) by each transducer element 104 and can be applied separately to a receiver 108 through a set of switches 110. The transmitter 106, receiver 108, and switches 110 are operated under the control of a controller 112, which may include one or more processors. As one example, the controller 112 can include a computer system. In a non-limiting example, the controller 112 may wirelessly connect to the transmitter 106, receiver 108, and switches 110. Alternatively, the controller 112 may connect to the transmitter 106, receiver 108, and switches 110 via wired connection. In a non-limiting example, the controller 112 may be portable.

The transmitter 106 can be programmed to transmit unfocused or focused ultrasound waves. In some configurations, the transmitter 106 can also be programmed to transmit diverged waves, spherical waves, cylindrical waves, plane waves, or combinations thereof. Furthermore, the transmitter 106 can be programmed to transmit spatially or temporally encoded pulses.

In some configurations, beam steering may be used. Beam steering may be accomplished by energizing each transducer element 104, or a subset of transducer elements, in a specified sequence to steer an ultrasound beam along path R to target point P at an angle θ from the axis of the transducer array 102.

The receiver 108 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 106 and the receiver 108 can be programmed to implement a high frame rate. For instance, a frame rate associated with an acquisition pulse repetition frequency ("PRF") of at least 100 Hz can be implemented. In some configurations, the ultrasound system 100 can sample and store at least one hundred ensembles of echo signals in the temporal direction.

The controller 112 can be programmed to design an imaging sequence using the techniques described in the present disclosure, or as otherwise known in the art. In some embodiments, the controller 112 receives user inputs defining various factors used in the design of the imaging sequence.

A scan can be performed by setting the switches 110 to their transmit position, thereby directing the transmitter 106 to be turned on momentarily to energize transducer elements 104 during a single transmission event according to the designed imaging sequence. The switches 110 can then be set to their receive position and the subsequent echo signals produced by the transducer elements 104 in response to one or more detected echoes are measured and applied to the receiver 108. The separate echo signals from the transducer elements 104 can be combined in the receiver 108 to produce a single echo signal.

The echo signals are communicated to a processing unit 114, which may be implemented by a hardware processor and memory, to process echo signals or images generated from echo signals. As an example, the processing unit 114 can process images from a wearable system using the methods described in the present disclosure. Images produced from the echo signals by the processing unit 114 can be displayed on a display system 116.

Figure 2:
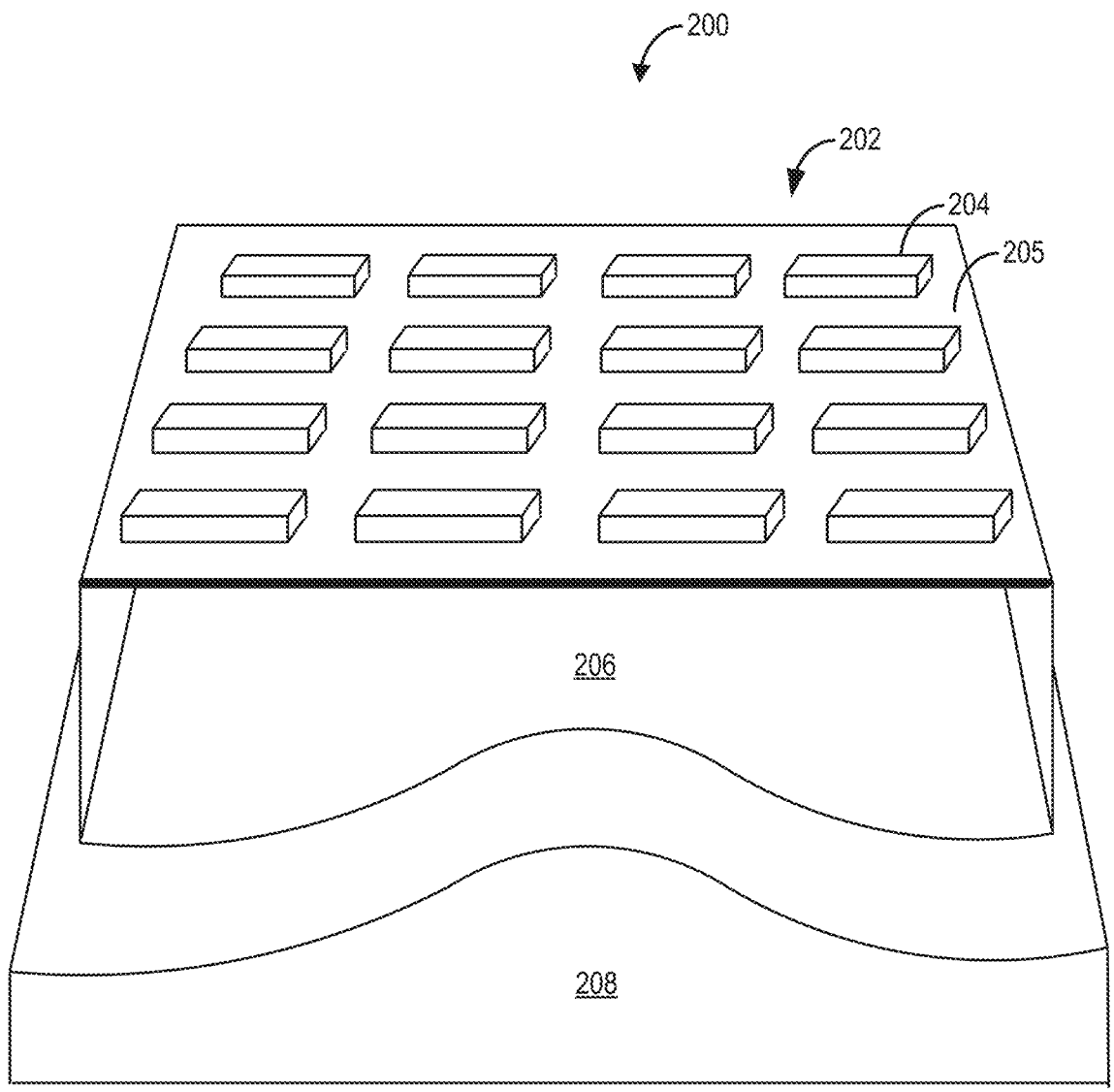
FIG. 2 is a profile view of a non-limiting example wearable ultrasound system.

Referring to FIG. 2, a non-limiting example on-person, wearable system 200 is shown. Again, in this non-limiting example, the electronic device or sensor is an ultrasound probe 202. The ultrasound probe 202 may include an array of transducer elements 204. In some configurations, the ultrasound probe 202 may be a thin, rigid or flexible ultrasound probe, such as by including a substrate 205, which may be a circuit board or other such structure. The wearable system 200 may include a couplant 206. In some non-limiting examples, the couplant 206 may be a hydrogel-elastomer hybrid with bioadhesive layers. While conventional systems may require the skin to deform to the rigidity of the ultrasound array, or for the ultrasound array to be bent to conform to the skin, the couplant 206 may be used to conform to the skin surface 208 without requiring either the skin surface 208 to deform or to require the ultrasound probe 202 to bend or deform.

In some configurations of a hydrogel-elastomer hybrid, the hydrogel may include hydrophilic polymers or copolymers that have good acoustic transmission. In non-limiting examples, the hydrogel may include a material such as polyacrylic acid, polyacrylamide, polyvinyl alcohol, polyhydroxy ethyl methacrylate, polyethylene glycol, polyurethane, casein, albumin, gelatin, chitosan, hyaluronic acid, alginate, oxidized alginate, cellulose, oxidized cellulose, κ-Carrageenan, sulfonated polysaccharides and the like. In some configurations, the hydrogel may include chemical or physical crosslinkers (e.g., gelatin methacrylate, hyaluronic acid methacrylate, oxidized methacrylic alginate, polycaprolactone diacrylate, N,N'-bis(acryloyl) cystamine, N,N'-methylenebis(acrylamide), polyvinyl alcohol, acrylic cyclodextrin (CD), and adamantlyacrylate, t-butylacrylate, polyethylene glycol diacrylate, polyethylene glycol dimethacrylate), in a single, double, or multiple networks.

The elastomer may include one, or more elastic polymers or rubbers that have high stretchability. Non-limiting example elastomer material include natural rubbers, styrene-butadiene block copolymers, polyisoprene, polybutadiene, ethylene-propylene rubber, ethylene propylene diene rubber, silicone elastomers, fluoroelastomers, polyurethane elastomers, nitrile rubbers, and the like.

The bioadhesive layer may include of one or more adhesive polymers that can adhere to the skin without corrosions. Non-limiting example bioadhesive layer materials include animal glue, casein glue, starch, dextrin, agar, algin, gum arabic, epoxy resins, nitrocellulose, polyvinyl acetate, vinyl acetate-ethylene copolymer, polyethylene, polypropylene, polyamides, polyesters, acrylics, cyanoacrylics, natural rubber, butyl rubber, butadiene rubber, styrene-butadiene rubber, nitrile rubber, silicone, neoprene, and the like.

In a non-limiting example, the hydrogel-elastomer couplant includes polyacrylamide (PAAm) and chitosan interpenetrating hydrogel, polypropylene elastomer, and poly(2-ethylhexyl acrylate-co-acrylic acid) bioadhesive.

In another non-limiting example, the hydrogel-elastomer couplant includes polyacrylamide (PAAm) and κ-Carrageenan interpenetrating hydrogel, and polyurethane bioadhesive elastomer.

Figure 3:
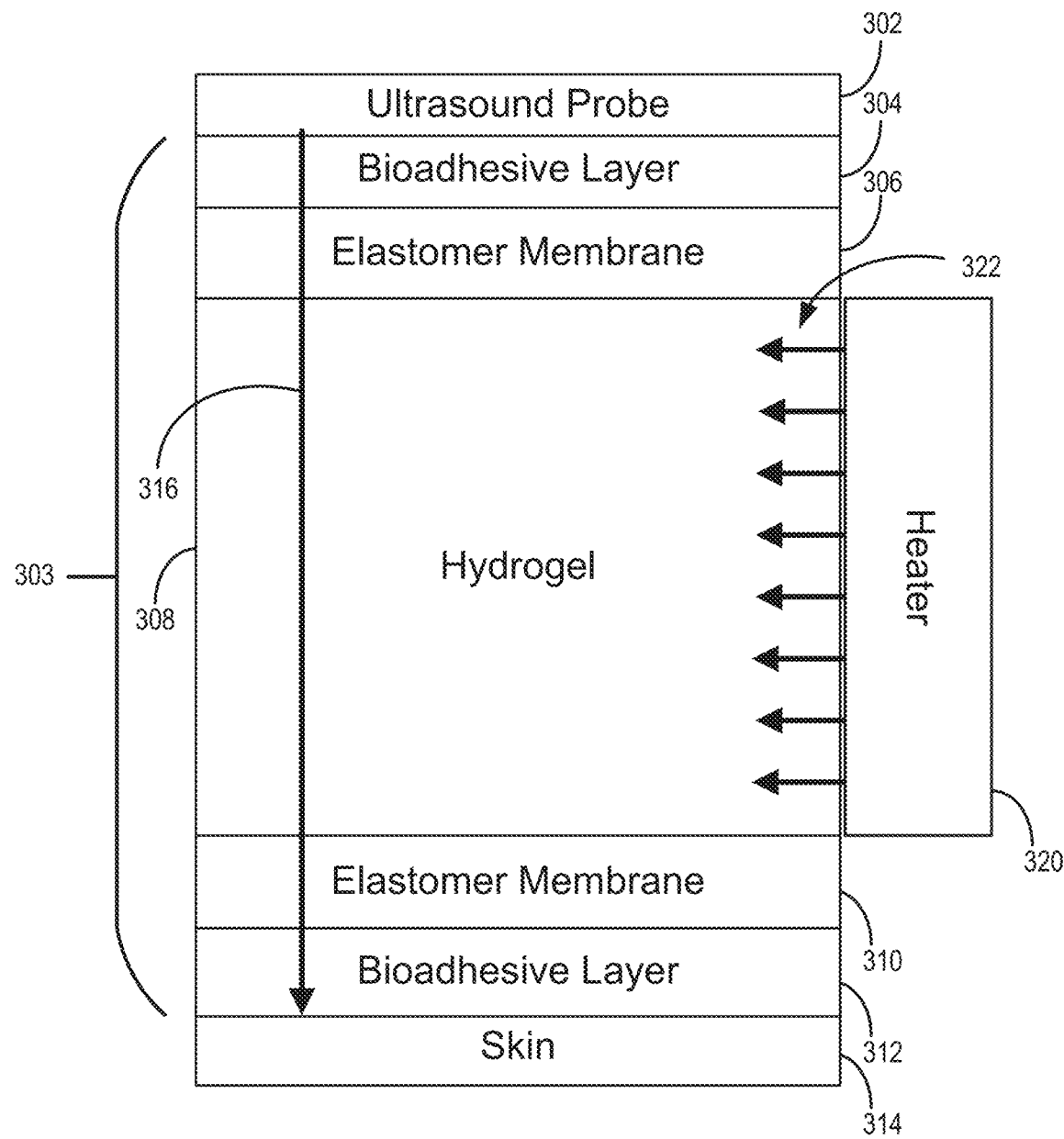
FIG. 3 is a cross-section of a non-limiting example wearable ultrasound system.

Referring to FIG. 3, a cross-section of a non-limiting example wearable ultrasound system is shown. A thin, rigid ultrasound probe 302 may be coupled to a couplant 303 via an upper bioadhesive layer 304. The couplant 303 may include an elastomer membrane 306 and 310 encapsulating a hydrogel 308. A lower bioadhesive layer 312 may be used to provide fixed, but removable coupling to a skin surface 314. Ultrasound transmission 316 may propagate from the probe 302 to the skin 314 on transmit, and ultrasound may be detected from the skin 314 on detection.

The couplant 303 may also include the hydrogel 308, which, like the elastomer membrane 306, 310 is designed for transmission of electronic signals or sensing information from the skin 314 and tissue or organs below the skin 314. In one non-limiting example, the hydrogel 308 may contain 95 wt % water and be encapsulated by the elastomer membrane 308 and 310 and further coated by a thin bioadhesive layer with upper and lower bioadhesive layers 304 and 312. The couplant 303 may maintain robust adhesion between the ultrasound probe 302 or probe and the skin 314 over the long term and may insulate the ultrasound probe 302 from skin deformation during dynamic body motions. For example, the system may be designed to be worn for multiple days, for example, 48 hours or more.

The couplant 303 may provide a set of characteristics and functions inaccessible to common ultrasound couplants. The elastomer membrane 306, 310 may be used to prevent dehydration of the encapsulated hydrogel and ensures robust and comfortable adhesion of the probe on the skin over the long term, such as >48 hours. In some configurations, the couplant 303 may be soft, and tough couplant that maintains elasticity and is stable under high forces. The couplant 303 may also shield the probe from skin deformation.

The acoustic transmissivity of the couplant 303 may maintain high transmissivity over the long term. In a non-limiting example, the acoustic transmissivity is >97% transmissivity relative to degassed water, and long term. In some configurations, the couplant 303 can readily adhere thin-profile probes of various commercial ultrasound devices to the skin over the long term. In some configurations, the couplant 303 may be fully constituted of common chemicals, which may be amenable to mass production as a low-cost medical supply, and facilitate the broad applications of devices. In a non-limiting example, the total thickness of the elastomer membrane and the bioadhesive layer may be below ¼ of the ultrasound wavelength.

The wearable ultrasound system may also include an optional heater 320 to provide thermal energy 322 to the hydrogel 308. The heater 320 may be removably coupled to the wearable ultrasound system. The thermal energy 322 can heat the hydrogel 308 of the adjustable BAUS couplant 303 from a normal skin temperature (e.g., 35° C.) to an elevated yet skin-tolerable temperature (e.g., 50° C.) for in situ adjustment of the adjustable BAUS probe's position on the skin.

Figure 4A:
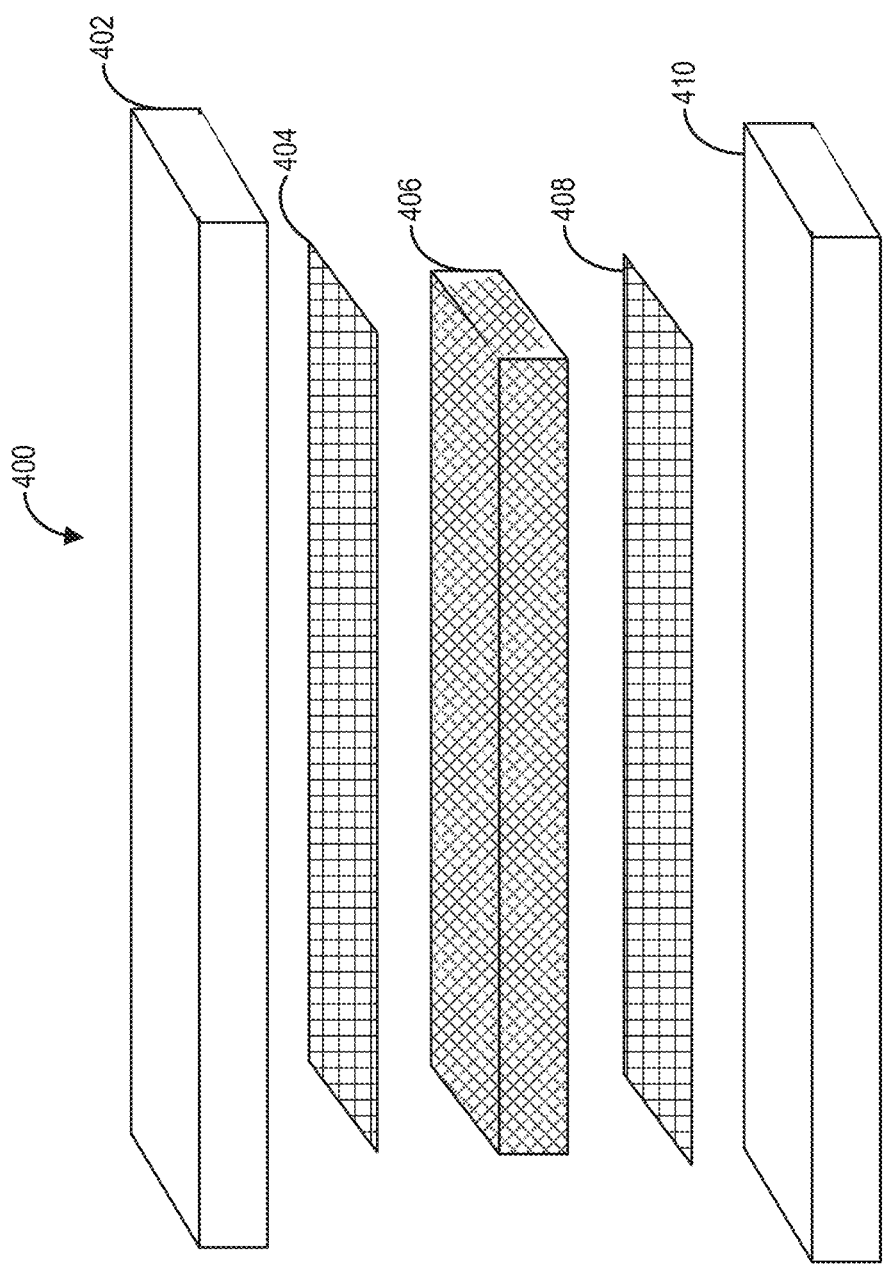
FIG. 4A is an exploded diagram for a non-limiting example ultrasound probe.

Referring to FIG. 4A, an exploded diagram is shown for a non-limiting example ultrasound probe 400. The ultrasound probe 400 can include a high-density matrix of high-performance piezoelectric transducers 406, which may be controlled by top circuits 404 and bottom circuits 408. The top and bottom circuits 404, 408 can be covered by the acoustic backing layer 402 and matching layers 410, respectively. In a non-limiting example, the high-density matrix of the transducer 406 includes over 2500 elements per square centimeter.

Figure 4B:
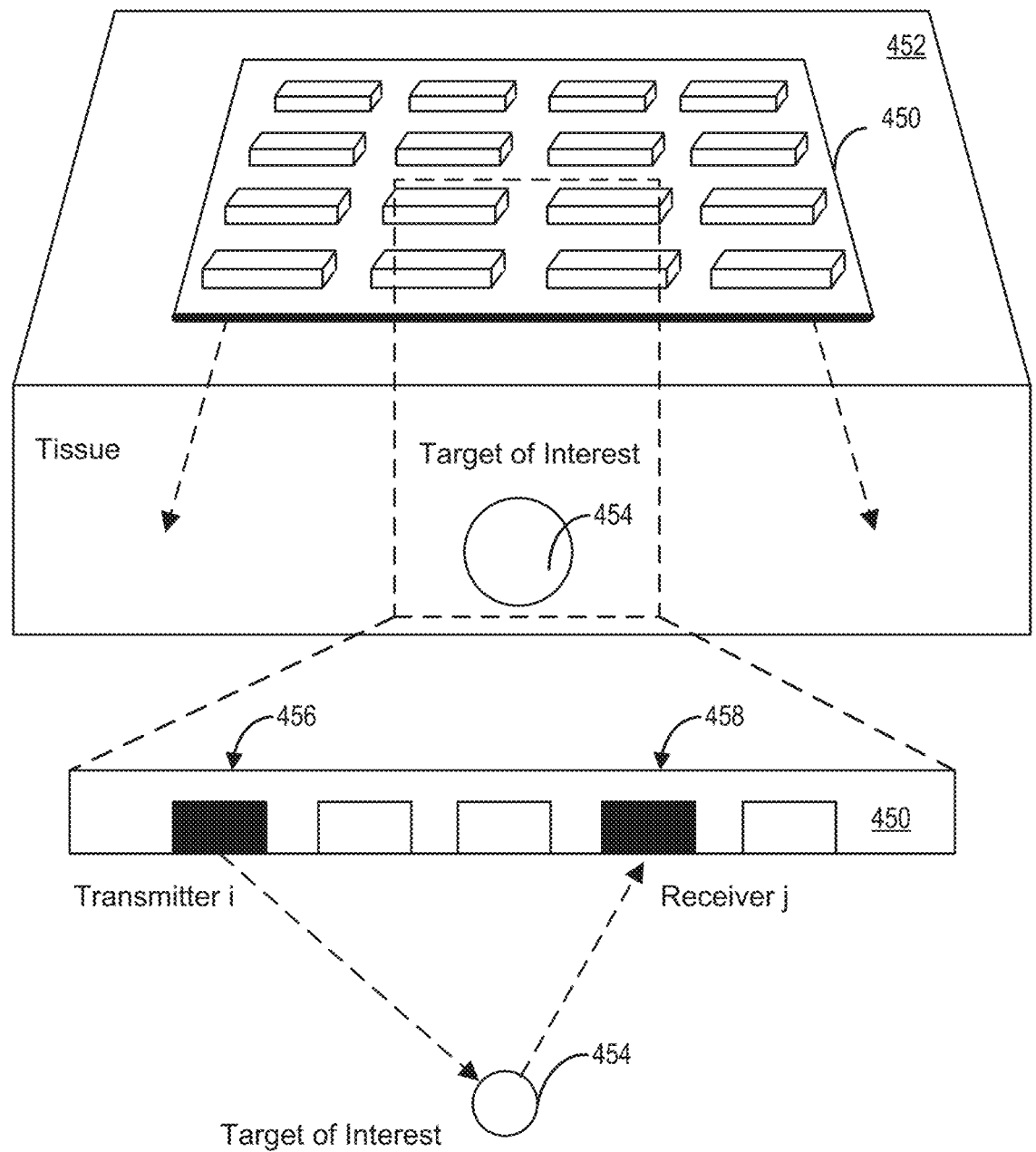
FIG. 4B is a depiction of a non-limiting example ultrasound probe placed on a flat tissue surface.

Referring to FIG. 4B, a non-limiting example of an ultrasound probe 450 placed on a flat tissue surface 452 is shown. A target of interest 454 may be imaged by ultrasound sent by transmitter 456 and detected by receiver 458. When the relative positions of the transmitter 456 ($x_i$, $y_i$) and the receiver 458 ($x_j$, $y_j$) are on a flat geometry, the spatial location of the target of interest P (x, y) can be calculated based on the signal received accurately. This is in contrast to a stretchable system that may deform to a surface and thereby introduce errors in attempting to image the target of interest 454 as the transmitter and receiver are no longer planar and no longer the same distance from the target, in addition to other challenges.

The on-person wearable ultrasound system can provide high-resolution (up to 200 μm), long-term (>48 hours) and may provide for continuous imaging of diverse internal tissues and organs, including blood vessels, muscle, heart, gastrointestinal tract, diaphragm, and the like. The system may also provide for the diagnoses and/or treatments of various diseases including hyper/hypotension, neuromuscular disorder, cardiac diseases, digestive diseases, COVID-19, and the like.

In some configurations, the ultrasound probe includes piezoelectric transducers with a center frequency ranging from 2 MHz to 10 MHz. The center frequency of the transducers determines the resolution and the penetration depth of the imaging, which can achieve a resolution of 200 μm for a penetration depth less than 6 cm and a resolution of 600 μm for a penetration depth up to 18 cm. Each transducer may be controlled by the top and bottom circuits of the ultrasound probe.

An ultrasound circuit may be fabricated with any appropriate technique, such as three-dimensional (3D) printing, laser etching, photolithography, and the like. In some configurations, circuit-line resolutions of 100 μm, 10 μm, and 1 μm, may be achieved for each method, respectively. The bottom circuit may be covered by an acoustic matching layer to enhance the acoustic transmissivity to the skin. The top circuit may be covered by an acoustic backing layer to quench any resonance effect.

In some configurations, the ultrasound probe may be sealed by a layer of epoxy for high stability and reliability in long-term applications. To connect the ultrasound probe to an image processing system, a wireless connection may be used, or a "plug-and-play" input/output (I/O) may be used for immediate download of data of the probe. In a non-limiting example, an I/O may include a flexible flat cable for forming a connection.

An ultrasound probe may be sized for use on a subject. In a non-limiting example, the probe may have a thickness of 3 mm, and a length and width ranging from 2 cm to 4 cm. The ultrasound probe may have a much smaller size and lighter weight (e.g., 10~40 g) than conventional ultrasound imaging probes. The bottom surface of the ultrasound probe (i.e., the matching-layer side) may be robustly adhered to the skin via the bioadhesive couplant.

The couplant may include a soft, yet tough hydrogel composed of chitosan-polyacrylamide (PAAm) interpenetrating polymer networks (such as 10 wt %) and water (such as 90 wt %). The hydrogel may be encapsulated by a thin elastomer membrane, such as with a thickness, <40 µm, of polyurethane to prevent dehydration of the hydrogel and to make the skin comfortably contact with a dry couplant surface, instead of a wet hydrogel, over a long term (>48 hours). The polyurethane may be grafted with poly(acrylic acid) coupled with N-hydroxysuccinimide ester (NHS ester) to form robust bonding between the elastomer membrane and the hydrogel. The hydrogel-elastomer hybrid may be further coated by a thin bioadhesive layer (such as with a thickness, <10 µm) synthesized by copolymerizing poly (ethylene glycol) diacrylate, 2-ethylhexyl acrylate, and acrylic acid.

The carboxylic acid, ethyl, and hexyl groups in the bioadhesive layer may form physical bonds, such as hydrogen bonds and electrostatic interactions with the skin and the probe surface, providing instant, stable, and noncorrosive adhesion over the long term. NHS ester groups, which form covalent bonds with the skin, can be further coupled to the bioadhesive layer to enhance the couplant's adhesion on the skin in wet environments such as sweating or soaking in water. The total thickness of the elastomer membrane and the bioadhesive layer may be selected to be less than ¼ of the acoustic wavelength, thus unaffecting the acoustic transmissivity of the couplant. In a non-limiting example, the transmissivity may be selected to be >97% relative to degassed water over 48 hours.

When a rigid device is adhered to the skin via the couplant, the interfacial toughness may exceed 100 $Jm^{-2}$ over the long term both in air and under water, maintaining robust adhesion of the device on the skin for any couplant thickness.

Non-Limiting Example Adhesion Test

Figure 5A:
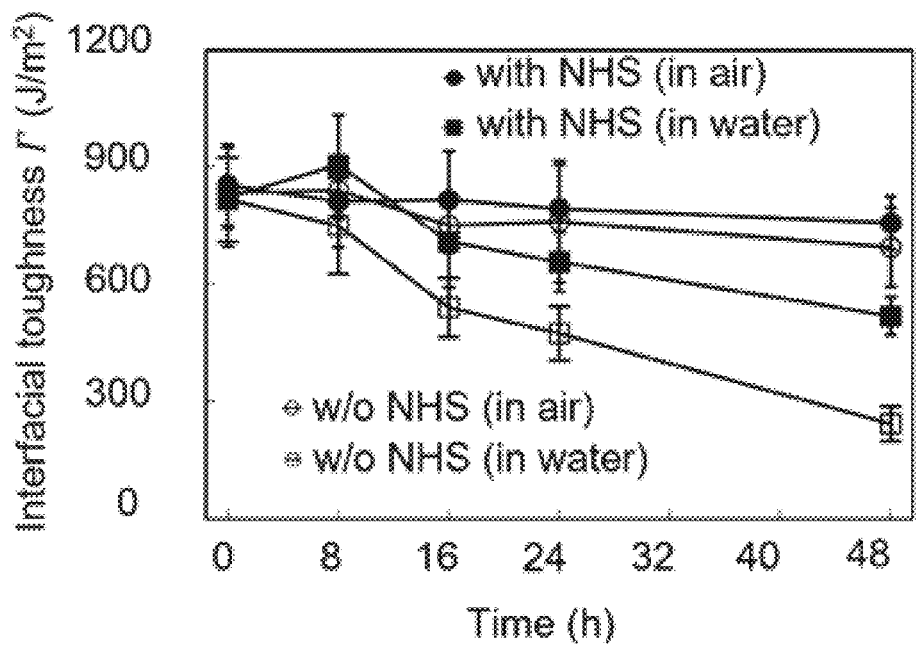
FIG. 5A is the adhesion performance of a non-limiting example wearable ultrasound system showing the interfacial toughness between the BAUS couplant and a porcine skin measured over 48 hours after adhesion formation. Error bars indicating standard deviation (±s.d.) of interfacial toughness (n=4 independent samples).
Figure 5B:
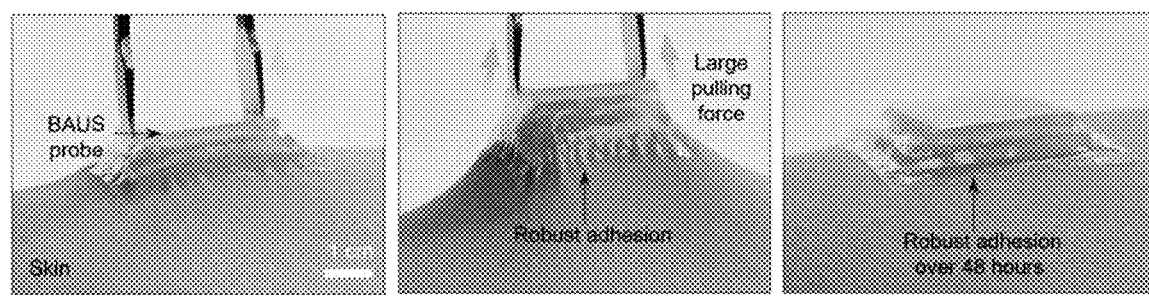
FIG. 5B shows that the non-limiting example wearable ultrasound system adhered on the skin can withstand high pulling forces and maintain robust adhesion on the skin over 48 hours.

To evaluate the adhesion performance of a device on the skin, a standard 90°-peeling test (ASTM D2861) was conducted to measure the interfacial toughness of the elastomer membrane adhered on a porcine skin via the bioadhesive layer. The porcine skin was chosen as the model tissue for the evaluation of adhesion performance owing to its resemblance to the human skin. The elastomer membrane can instantly establish tough adhesion on the porcine skin upon contact. The interfacial toughness between the elastomer membranes and the porcine skin adhered via bioadhesive layers without and with NHS ester groups was consistently above 800 J $m^{-2}$. When the adhered samples were stored in air (relative humidity, 3050%; temperature, 24° C.), the interfacial toughness exhibited only a relatively small decrease (<5%) over 48 hours. When the adhered samples were stored in water to simulate wet environments, the interfacial toughness for samples adhered via bioadhesive layers without and with NHS ester groups decreased to 575 J $m^{-2}$ and 280 J $m^{-2}$, respectively, over 48 hours. These results show that the bioadhesive layer is expected to maintain robust adhesion of the device on the skin over 48 hours in dry and wet environments, as shown in FIGS. 5A-5B.

Figure 6A:
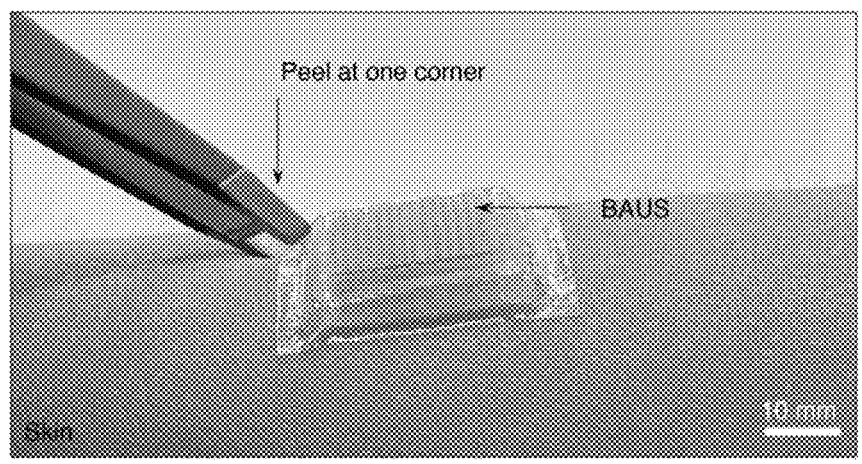
FIG. 6A is a photograph of detaching a non-limiting example wearable ultrasound system. initiated anytime by peeling from one corner of the non-limiting example wearable ultrasound system couplant.
Figure 6B:
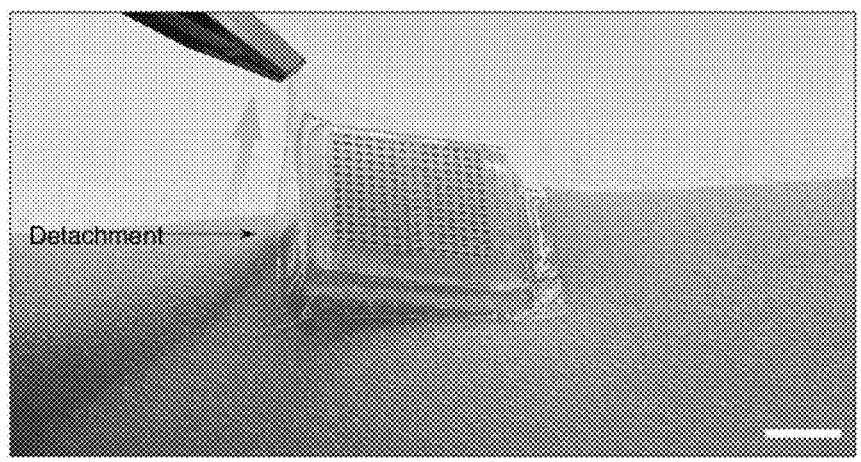
FIG. 6B shows the detachment process by lifting the one corner up and away from the surface of the skin.
Figure 6C:
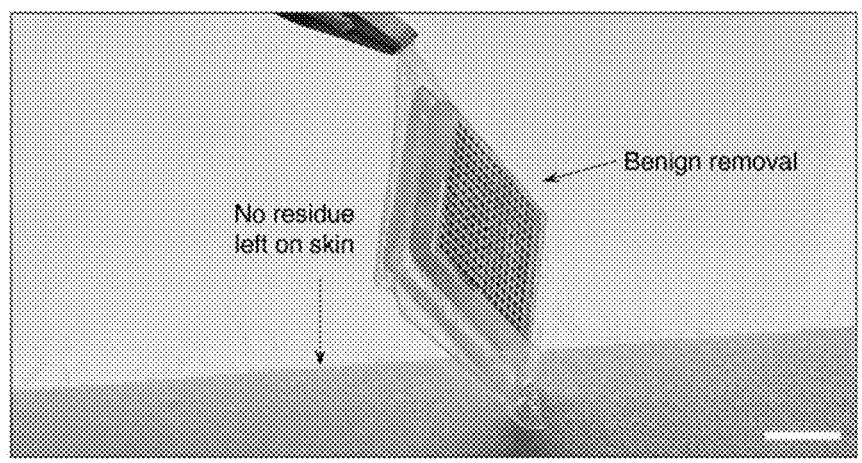
FIG. 6C shows that no residue is left on the skin after the removal.

The bioadhesive layer with NHS ester groups can give more stable adhesion in wet environments. A device can be detached from the skin by peeling from one edge of the couplant without leaving any residue, as shown in FIGS. 6A-6C.

A study was performed to evaluate one example of a system described above that formed a BAUS device. To evaluate the wearing comfort of the device on the skin, a set of couplants were adhered on various body locations including arm, neck, chest, and waist of 5 subjects for 48 hours. All BAUS couplants maintained robustly adhered on the subjects over 48 hours. Most of the subjects reported no positive reaction (i.e., itchiness, irritation, dryness, or redness) at any location. As control samples, silicone patches and liquid couplant were mechanically wrapped around the arm of the 5 subjects for 48 hours. Positive reactions occurred on 2 subjects wearing the silicone patches and all 5 subjects wearing the liquid couplant. These results demonstrated the superior wearing comfort and skin compatibility of the BAUS couplant.

Figure 7A:
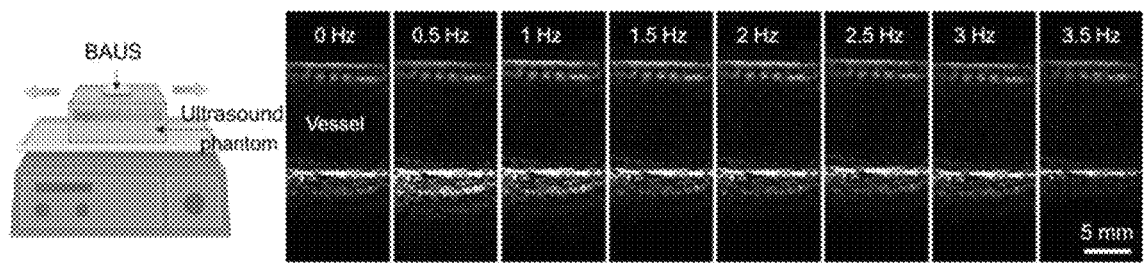
FIG. 7A shows a schematic illustration of the antivibration testing setup and imaging result under vibration. Testing setup consists of an orbital shaker with vibration frequency from 0~3.5 Hz and an ultrasound phantom on the top of the shaker. The imaging is performed on a mock vessel in the ultrasound phantom by the non-limiting example wearable ultrasound system at different vibration frequencies.
Figure 7B:
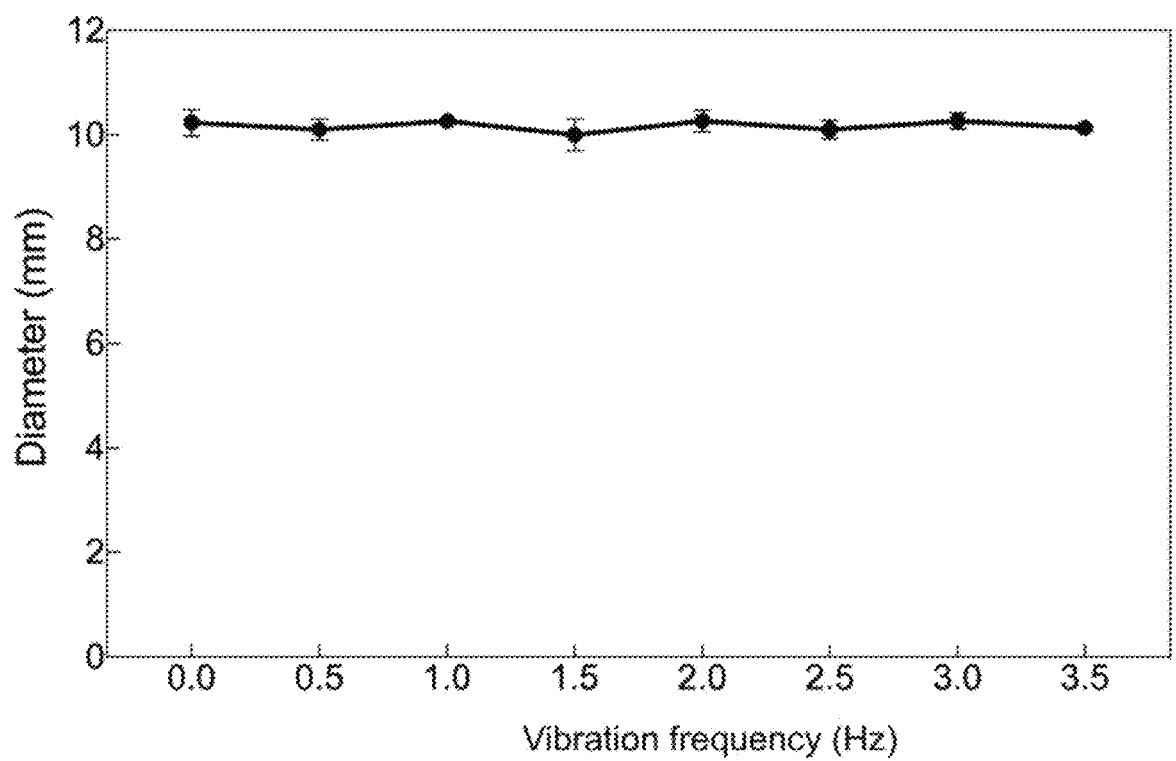
FIG. 7B shows the quantitative analysis of the diameter of the mock vessel imaged by the non-limiting example wearable ultrasound system at different oscillation frequencies. Error bar values represent mean±s.d. (n=3 independent samples).

To evaluate the acoustic performance of the BAUS device, the relative acoustic transmissivity was measured of a BAUS couplant. The measured relative acoustic transmissivity was consistently above 97% over 48 hours (relative to degassed water), demonstrating the high stability and acoustic transmissivity of the BAUS couplant during long-term imaging. The BAUS device was adhered on a phantom of a blood vessel in soft tissues under various frequencies of vibration (0 Hz to 3.5 Hz with an amplitude of 2 cm) to evaluate its acoustic performance under dynamic body motions. The BAUS device was able to continuously and stably image the blood vessel's long axis under severe vibration of various frequencies (FIGS. 7A-7B), demonstrating its stable imaging quality under dynamic body motions.

Figure 8A:
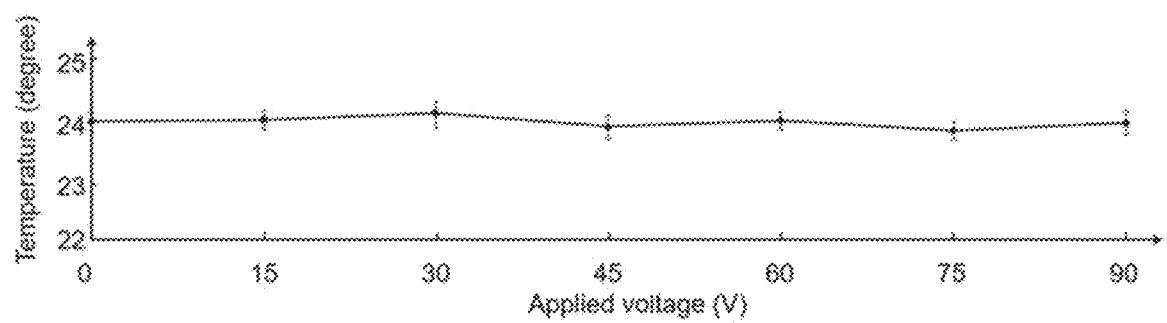
FIG. 8A is the thermal characterization of a non-limiting example wearable ultrasound system under various working voltages (0, 15, 30, 45, 60, 75, 90 V). The graph shows the highest temperature on the device versus the working voltage. Error bar values represent mean±s.d. of the highest temperature on the device surface (n=3 independent samples).
Figure 8B:
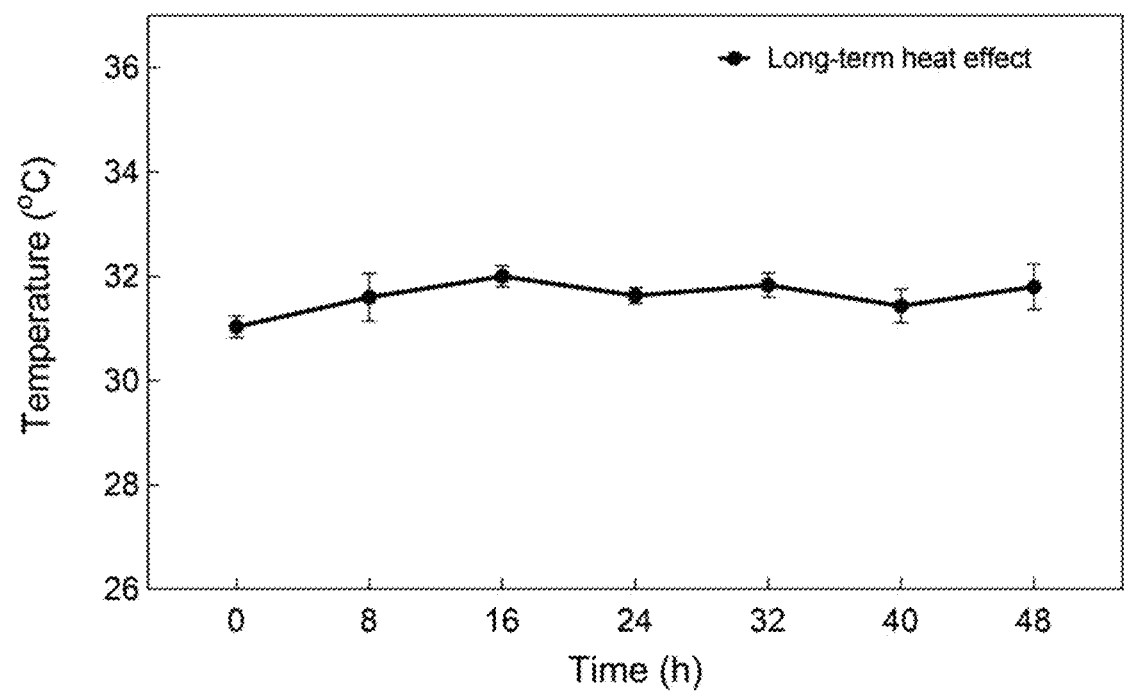
FIG. 8B is the thermal characterization of a non-limiting example wearable ultrasound system adhered on the skin under 90 V working voltage for 48 hours. The graph shows the highest temperature on the device versus time. Error bar values represent mean±s.d. of the highest temperature on the device surface (n=3 independent samples).

The temperature of the BAUS device was continuously actuated by various levels of working voltages (0V-90V) over 48 hours and measured, as show in FIGS. 8A-8B. Provided a low working power and thin form factor for heat dissipation, the BAUS device maintained a constant level of temperature (24° C.) while continuously imaging for 48 hours, further validating its imaging stability in long-term applications.

High-Resolution Long-Term Continuous Imaging of Diverse Organs

Figure 9:
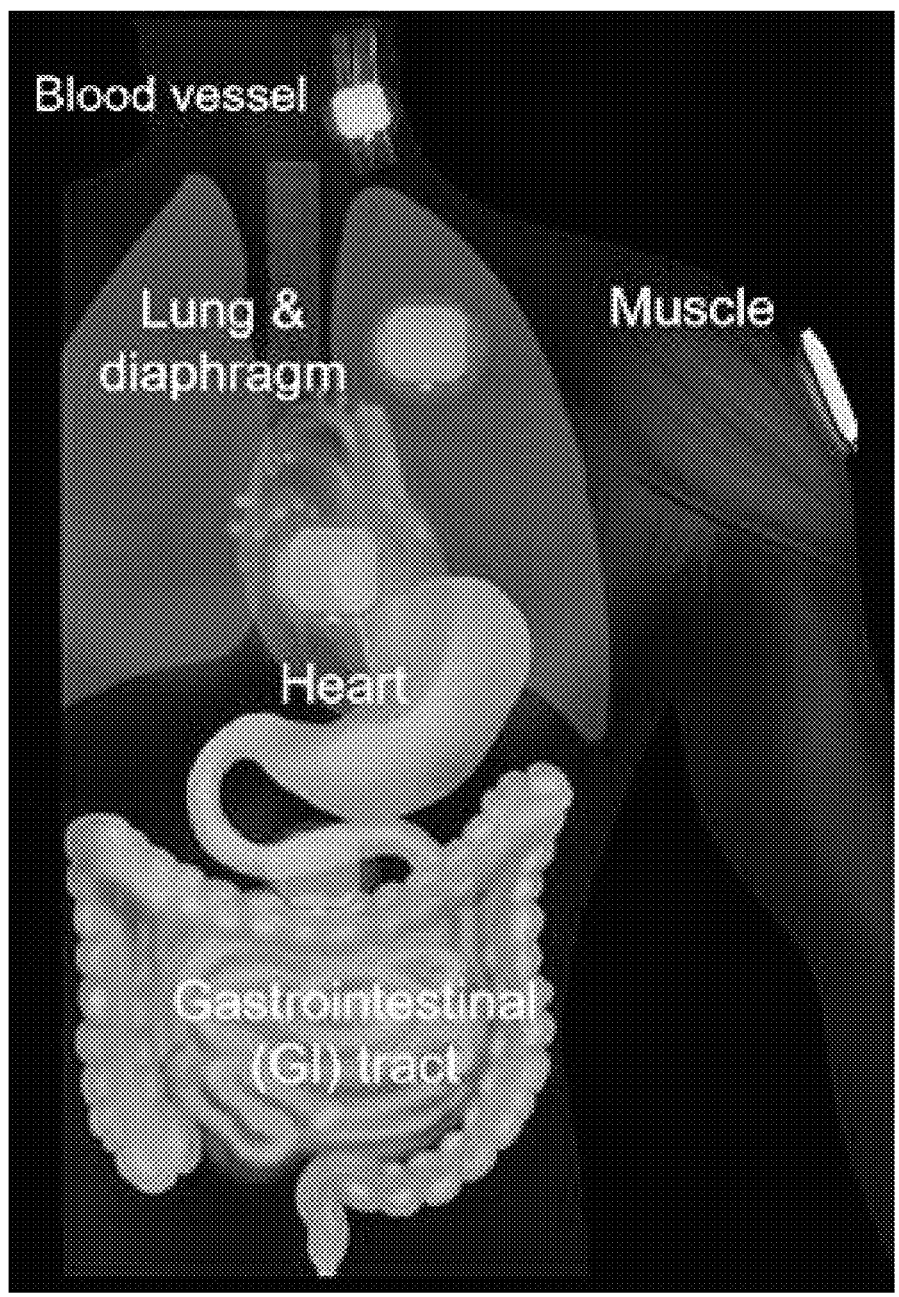
FIG. 9 is a schematic of a non-limiting example wearable ultrasound system adhered on various locations on the body of the subject to image the corresponding organs.

In some configurations, a wearable imaging platform capable of high-resolution, long term, continuous imaging of human organs including blood vessels and heart, muscle and diaphragm, stomach, and lung is provided (FIG. 9). The organs represent the cardiovascular, muscular, digestive, and respiratory systems, respectively. To image organs with depths less than 6 cm beneath the skin (i.e., jugular vein, carotid artery, and bicep muscle), an ultrasound probe with a center frequency of 6~10 MHz may be configured and may use a synthetic aperture imaging method. To image organs deeper than 6 cm beneath the skin (i.e., heart, stomach, diaphragm, and lung), an ultrasound probe with a center frequency of 2~5 MHz may be used with a phased array imaging method. The probes may be adhered to various locations on the skin of a subject via the BAUS couplants for continuous imaging of the corresponding organs over a selected period of time, such as 48 hours, or continuously.

Figure 10A:
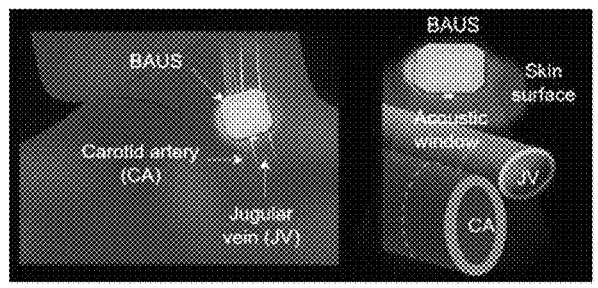
FIG. 10A shows a schematics of a non-limiting example wearable ultrasound system adhered on the neck of a subject to image the carotid artery and jugular vein.
Figure 10B:
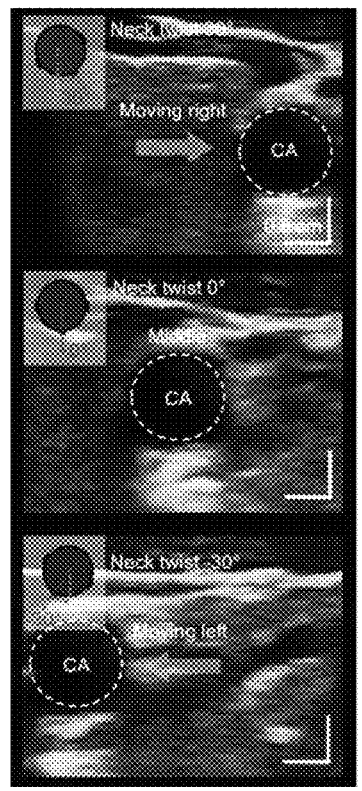
FIG. 10B shows that the non-limiting example wearable ultrasound system can stably image the blood vessels under dynamic body motions such as neck rotation with angles up to ±30 degrees. Scale bar, 0.5 cm.

Dynamic body motions such as neck rotation can cause blood vessel shifting and skin deformation, which dramatically deteriorate the imaging quality and stability of existing wearable ultrasound devices. In contrast, a BAUS device can provide high-resolution (200 µm) continuous imaging of a structure, such as the jugular vein and carotid artery (FIG. 10A), under dynamic body motions such as neck rotation with angles up to ±30 degrees (FIG. 10B). Robust adhesion of the BAUS device on the neck, the high imaging resolution of the BAUS probe, and a large acoustic window given by the BAUS probe aperture (such as an aperture of 2 cm×2 cm) can mitigate dynamic motion effects.

Figure 10C:
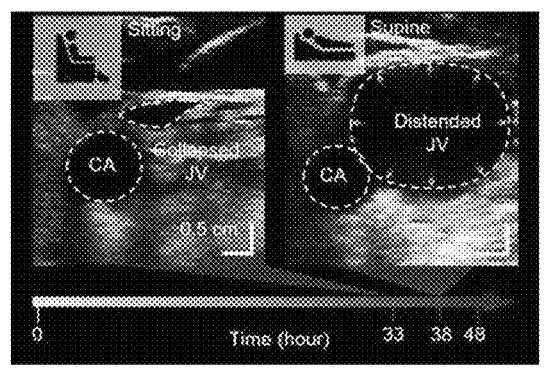
FIG. 10C shows the diameter of the jugular vein increases significantly from the sitting/standing position to the supine position.

In a non-limiting example, a wearable ultrasound system was used to acquire imaging results of the jugular vein and carotid artery. The image results were obtained by a 10 MHz BAUS device adhered on the right-hand side of the neck. The BAUS imaging results showed that the diameter of the jugular vein in the subject increases significantly from the sitting/standing position to the supine position on a daily basis. The change of the jugular vein diameter strongly correlated with the right atrium pressure, and thus can be used to diagnose cardiac diseases such as heart failure and pulmonary hypertension. The BAUS imaging results further gave 48-hour continuous blood flow rate and blood pressure waveform of the carotid artery. Dramatic increases in the diameter (from 0.5 cm to 1.75 cm), blood flow rate (from 65 cm/s to 117 cm/s), and systolic blood pressure (from 115 mmHg to 168 mmHg) of the carotid artery in the subject were observed before and after 0.5 hour of physical exercise (FIG. 10C). From the blood pressure waveform after the physical exercise, a steeper drop of the blood pressure from the systolic peak in each cardiac cycle was observed than that before the exercise, possibly due to the exercise-induced vasodilation of the carotid artery. Such long-term continuous monitoring of real-time changes in blood flow rate and blood pressure waveform could provide unprecedented information about one's dynamic cardiovascular status and enable new and powerful tools for cardiovascular disease diagnoses and prognoses (FIGS. 10D-10F).

In a non-limiting example, imaging results of a bicep muscle were obtained by a 7 MHz BAUS device adhered to the upper arm of a subject. The BAUS system can give high-resolution (300 µm) continuous imaging of the bicipital muscle. Increased blood perfusion and echogenicity on the muscle and tendon interface was observed 2 hours after a 1-hour weightlifting training and increased vascularity 10 hours after the training. Such long-term continuous imaging of the musculoskeletal system could facilitate the advancement of sports medicine.

Figure 11A:
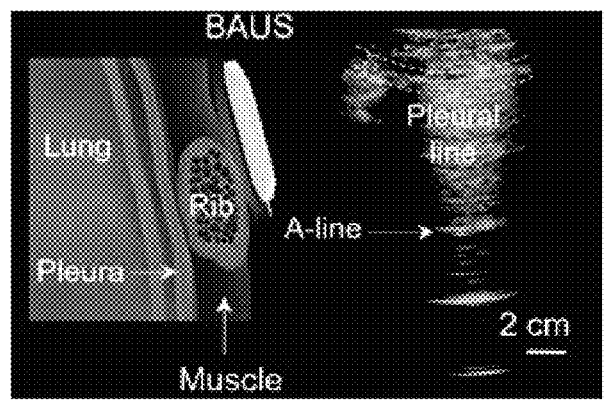
FIG. 11A is the non-limiting example wearable ultrasound imaging showing a smooth pleural line and repetitive A-lines of the lung.

In a non-limiting example, imaging results of the lung were obtained by a 4 MHz BAUS phased array device adhered on the right chest (longitudinal direction) of the subject, as shown in FIG. 11A. The BAUS system can give high-resolution (500 µm) continuous imaging of key characteristics of the lung including the pleural line, A-lines, and B-lines. The BAUS imaging showed a smooth pleural line and repetitive A-lines of the subject over 48 hours, indicating a healthy, normally-aerated lung. While lung ultrasonography has proven to be an effective tool for the diagnoses and treatments of COVID-19 patients, it is mostly available in hospitals for infrequent and non-continuous imaging of the lung. A wearable BAUS system could continuously monitor the symptoms of possibly infected COVID-19 patients at home, providing critical real-time information on the health status and disease progression of the patients.

Figure 11B:
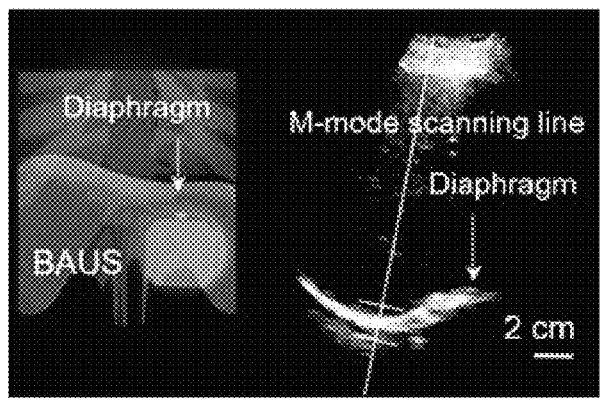
FIG. 11 B is the non-limiting example wearable ultrasound imaging showing clear diaphragm morphology.
FIG. 11C is the non-limiting example wearable ultrasound imaging showing that the diaphragm motility increases significantly in amplitude and frequency after 0.5 hour of physical exercise.
Figure 11C:
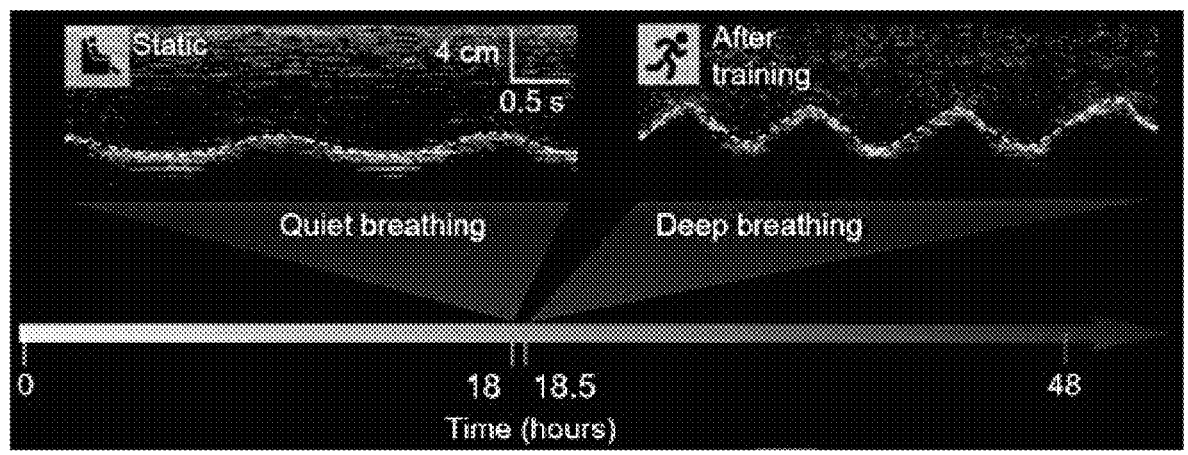

In a non-limiting example, imaging results of the diaphragm motility were obtained by a 4 MHz BAUS phased array device adhered on the right anterior subcostal region of the subject before and after 0.5 hours of physical exercise, as shown in FIGS. 11B-11C. The BAUS imaging showed that the diaphragm motility after training was more dramatic in amplitude and frequency compared with the quiet breathing before training.

Figure 12A:
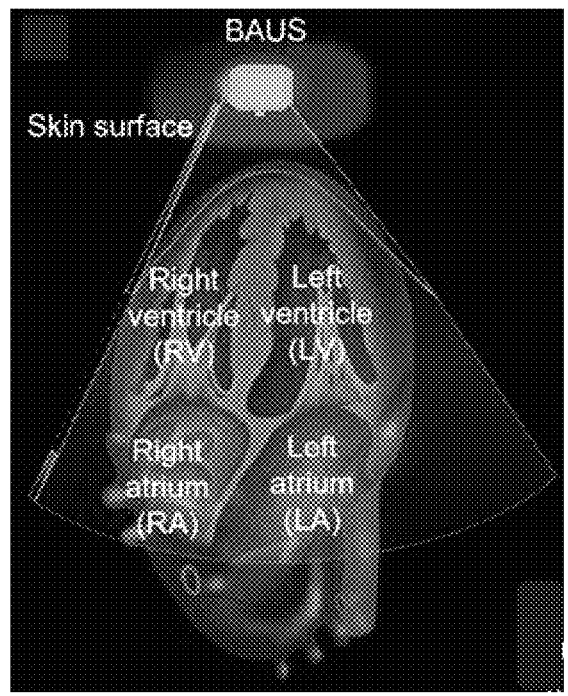
FIG. 12A is the non-limiting example wearable ultrasound imaging showing the dynamics of the four chambers of the heart.
Figure 12B:
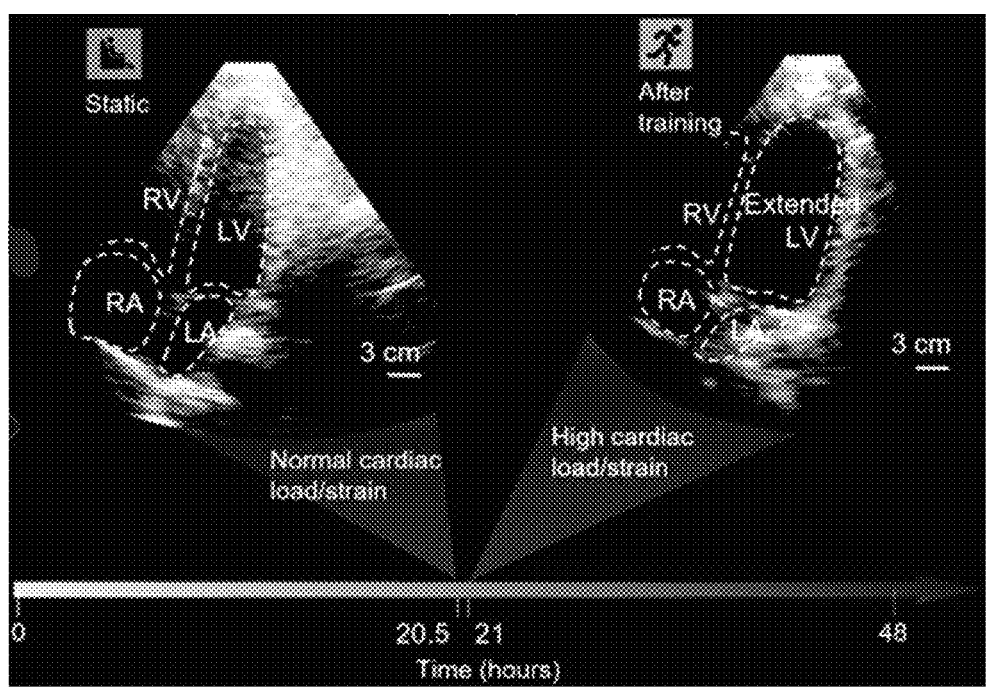
FIG. 12B shows that the size of the left ventricle significantly increases after 0.5 hours of physical exercise.

In a non-limiting example imaging results of the heart were obtained by a 4 MHz BAUS phased array adhered on the left chest of the subject (imaging through the apical 4-chamber view). The BAUS system can give high-resolution (600 µm) continuous imaging of the dynamics of the four cardiac chambers including the right ventricle, right atrium, left ventricle, and left atrium (FIG. 12A). The size of the left ventricle was observed to significantly increase after 0.5 hours of physical exercise. The continuous images of the cardiac chambers can be further processed to calculate the dynamics of cardiac strain—an important parameter that could indicate cardiomyopathy (FIG. 12B). Cardiovascular diseases usually have weak and infrequent symptoms at the initiation such as random seizures, which are difficult to be captured even by routine health screening. The wearable BAUS platform can provide high-resolution continuous imaging of cardiac dynamics over days, enabling early detection and diagnoses of various cardiovascular diseases.

Figure 13A:
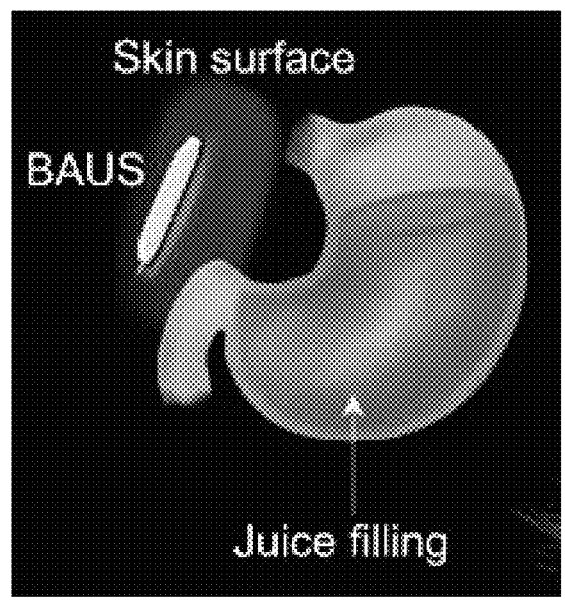
FIG. 13A is high-resolution long-term continuous non-limiting example wearable ultrasound imaging of the stomach.
Figure 13B:
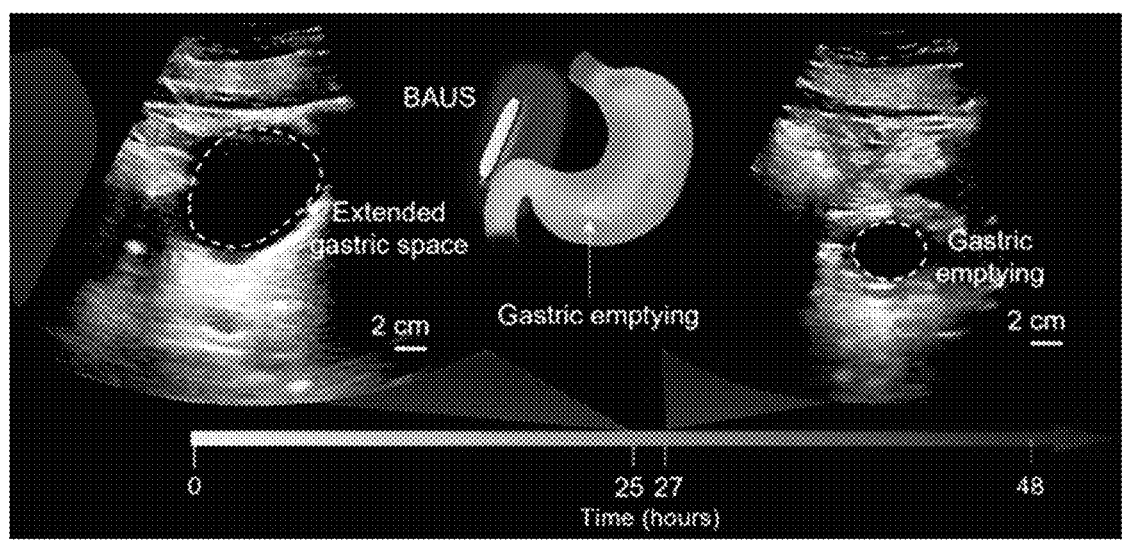
FIG. 13B shows the non-limiting example wearable ultrasound imaging of the dynamics of the stomach.

In a non-limiting example, imaging results of the stomach were obtained by a 4.5 MHz BAUS phased array device adhered on the upper abdomen skin of the subject (FIG. 13A). The BAUS imaging system gave high-resolution (500 µm) 48-hour continuous imaging of the gastric antral cross-section. An extended gastric antrum was observed once the subject drank 450 ml of juice. Over 2 hours thereafter, the gastric antral cross-sectional area gradually decreased due to the gastric emptying (FIG. 13B). Gastrointestinal motility can indicate systematic digestion, which affects the systematic nutrient intake and metabolism. The BAUS imaging system can provide high-resolution continuous imaging of the gastrointestinal motility by adhering the BAUS devices at various locations on the abdominal skin.

A BAUS imaging platform may be used for other human organ systems to provide information for precision and digital medicine due to high-resolution long-term continuous imaging ability. A BAUS imaging platform may provide high-resolution long-term continuous imaging of the developments of diverse tissues and organs, including embryos, tumors, and brains in a non-invasive process. The high-quality long-term time-series images of various tissues and organs obtained by the BAUS imaging platform may provide for training deep-learning models for future clinical and biological applications.

In a non-limiting example, bioadhesive focused ultrasound (BAFUS) devices may be used for high-resolution long-term on-demand stimulation of various tissues and organs of the body. A BAFUS stimulation may be guided by a BAUS imaging system, synergistically achieving close-loop diagnoses and treatments.

Conventional epidermal devices design includes making the devices thin and stretchable for conformal attachment on the skin. The thin stretchable form factor often compromises the devices' reliability and functionality yet cannot always guarantee the devices' stable adhesion on the skin. A ultrasound system in accordance with the present disclosure may be used to robustly adhere thin rigid devices on the skin via a soft, tough, and bioadhesive coupling layer, which effectively transmits acoustic waves, insulates the devices from skin deformation, and maintains long-term robust and comfortable adhesion on the skin. The bioadhesive coupling layers may enable electrical, optical, and chemical interfacing with the skin.

Figure 14:
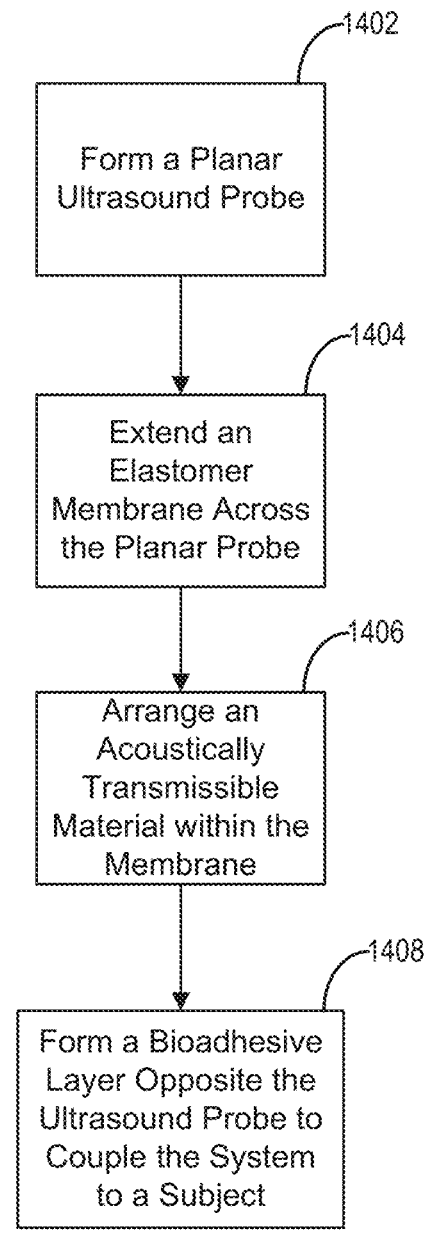
FIG. 14 is a flowchart of non-limiting example steps for a method for forming an extended ultrasound imaging system.

Referring to FIG. 14, a flowchart is provided that includes non-limiting example steps of a method for forming an extended ultrasound imaging system. An ultrasound probe with of a plurality of transducers arranged across a plane may be formed at step 1402. An elastomer membrane may be extended across and coupled to the plane of the ultrasound probe at step 1404. An acoustically transmissible material may be arranged within the elastomer membrane at step 1406. A bioadhesive layer may be formed and coupled to the elastomer membrane on a side opposite to the ultrasound probe at step 1408 and configured to couple the elastomer membrane to the subject.

In a non-limiting example couplant formation, chemicals for synthesizing a tough hydrogel may include acrylamide (AAm), acetic acid (AAc), α-ketoglutaric acid, chitosan (high molecular weight), N, N'-methylenebisacrylamide (MBA), calcium chloride ($CaCl_2$)), κ-Carrageenan and the like. The chemicals for synthesizing the elastomer membrane may include hydrophilic polyurethane (Advan Source biomaterials), hydrophobic polyurethane (Advacn Source biomaterials), acrylic acid (AAc), benzophenone, α-ketoglutaric acid, 1-ethyl-3-(3-dimethylaminopropyl) carbodiimide (EDC), and N-hydroxysuccinimide (NHS). The chemicals for synthesizing the bioadhesive layer may include acrylic acid (AAc), acrylic acid N-acryloxysuccinimide (AAc-NHS ester), 2-hydroxy-4'-(2-hydroxyethoxy)-2-methylpropiophenone (Irgacure 2959), polycaprolactone polyurethane, 2-ethylhexyl acrylate (EHA), poly(ethylene glycol) diacrylate (average Mn 560, PEGDA), ethanol, 1-ethyl-3-(3-dimethylaminopropyl) carbodiimide (EDC), and N-hydroxysuccinimide (NHS).

In a non-limiting example, to prepare a PAAm-Chitosan tough hydrogel a 3% (w/w) high molecular weight chitosan, 12% (w/w) acrylamide, 0.15% (w/w) N, N'-methylenebisacrylamide, 0.3% (w/w) α-ketoglutaric acid may be dissolved in 1% acetic acid solution. The mixture may be centrifuged, such as at 6000 rpm, and poured into a mold, such as a glasses mold with a transparent cover. The solution may then be cured in ultraviolet light (UV) chamber, such as at 364 nm, 10 W power, for 60 min. The resulting hydrogels may then be immersed in 1M $CaCl_2$) solution for a period of time, such as 24 hours, to reach an equilibrium state.

To prepare a non-limiting example PU elastomer membrane, 30% poly(acrylic acid) may be grafted onto hydrophilic PU by UV-initiated reaction, such as at 364 nm, 10 W power in the presence of 1.5 w/v % benzophenone, and 0.3 w/v % α-ketoglutaric acid for a period of time, such as 120 min. After the reaction, the mixture solution may be dialyzed (Cutoff Mn 3000 Da) against ethanol for a period of time, such as 3 days, and water for 3 days to obtain a pure adhesive PU. The purified adhesive PU may be washed with water and fully dried. In a clean glass, a thin layer of hydrophobic PU (30% w/w) may be spin-coated at 1500 rpm on the glass. After the hydrophobic PU is fully dried, a thin layer of hydrophilic PU (30% w/w) may be spin-coated at 1500 rpm on the hydrophobic PU layer. A thin layer of adhesive PU with EDC and NHS (30% w/w adhesive PU, 5% w/w EDC, and 5% w/w NHS) may be spin-coated at 1500 rpm on the hydrophilic PU layer. After the film is fully dried in airflow, such as for 4 hours, the PU elastomer membrane may be obtained.

To prepare a non-limiting example bioadhesive layer, 0.5% (w/w) Irgacure 2959, 0.05% (w/w) PEGDA, 12% (w/w) AAc, 35% (w/w) EHA may be dissolved in nitrogen-purged ethanol. The mixture may then be poured on a glass mold with spacers. The adhesive film may be obtained after curing the mixture under ultraviolet light (UV), such as 364 nm, 10 W power, for a period of time, such as 40 min.

For forming a hydrogel-elastomer hybrid, the hydrogel may be cut into a desired shape and size, and then the adhesive PU side of the elastomer membrane may be adhered onto the gel with a gentle press to avoid any bubbles. The hydrophobic side of the PU may be adhered onto the bioadhesive layer. The edge of the elastomer and bioadhesive encapsulation may be cut and sealed by laser sintering. The outer layer of the elastomer membrane may be the bioadhesive layer, which can adhere to the skin and device firmly after a gentle press.

Figure 15:
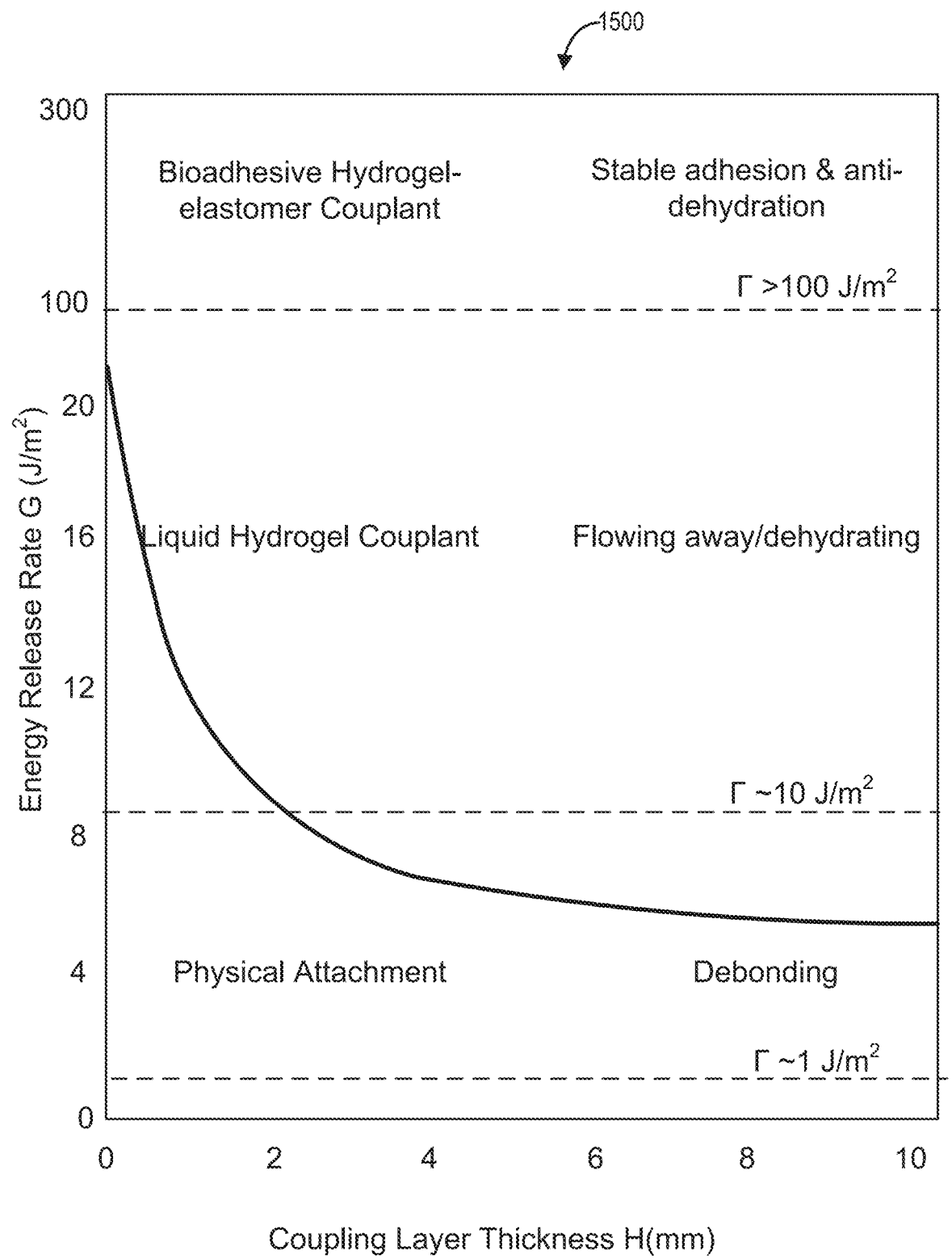
FIG. 15 is a graph of non-limiting example energy release rate G is shown as a function of the couplant layer thickness H.

Referring to FIG. 15, a graph 1500 of non-limiting example energy release rate G is shown as a function of the couplant layer thickness H. As shown, a rigid device physically attached on the skin may debond; a rigid device adhered on the skin via a liquid hydrogel couplant may form unstable adhesion due to flowing-away and dehydration of the couplant; but a rigid device adhered on the skin via a couplant in accordance with the present disclosure can form stable adhesion.

Acoustic Simulation of a Phased Array Probe

Phased array directivity, penetration, and intensity of transducers may be determined using a computer simulation. The center frequency and the geometry of all transducers in the array may be set to be identical. The input excitation voltage (40 V), the single-cycle pulse, and the electromechanical coefficient of all transducers may be set to be identical (0.6) as well. The attenuation coefficient of the media may be selected as 0.75 $dBcm^{-1}$ $MHz^{-1}$ to mimic acoustic properties of human tissues.

Measurement of the Interfacial Toughness

The interfacial toughness of the elastomer membrane may be determined. In a non-limiting example, an elastomer membrane was adhered on a porcine skin via the bioadhesive layer and measured using the standard 90°-peeling test (ASTM D 2861) with a mechanical testing machine (20 N load cells; Zwick/Roell Z2.5) and 90°-peeling fixture (Test Resources, G50). All tests were performed either in ambient air or in water at room temperature. The elastomer (thickness, 40 µm) and bioadhesive (thickness, 10 µm) were prepared with 2.5 cm in width W and 7.5 cm in length L. As a stiff backing for the elastomer membrane, a polycarbonate film was bonded onto the back surface of the elastomer. The resultant sample was tested with the standard 90°-peeling test with a constant peeling speed of 50 mm min-1. The measured peeling force reached a plateau (with slight oscillations), as the peeling process entered a steady state. The interfacial toughness G was determined by dividing the plateau force F by the width of the sample W.

Backing Layer Formation

The backing layer for the BAUS probe can give mechanical support to the transducers inside the probe that will generate high-frequency vibrations. The backing layer also may be selected to have strong attenuation of the ultrasound wave to effectively shorten the pulse duration and thus increase the imaging resolution. The backing design may be optimized by constructing transducers with backing layers of different compositions of epoxy (EPO-TEK 301) with tungsten powder (particle size 1 um, Sigma-Aldrich), and performing a comparison. In a non-limiting example, a composition of 8:1 (epoxy to tungsten powder, weight ratio) provided optimized acoustic properties. A BAUS probe with an optimized backing layer may provide for an increase in signal quality, including shorter pulse length and higher signal-to-noise ratio.

Matching Layer Formation

In a non-limiting example, the matching layer for the BAUS probe may be constructed by doping epoxy (EPO-TEK 301) with cerium dioxide nanoparticles (such as with a particle size of 10 nm), in ethanol (cerium dioxide weight ratio in epoxy from 0% to 80%). The matching layer may provide the required acoustic impedance gradient, which may provide for the acoustic energy from the transducer to smoothly penetrate into the body tissue and for the reflected acoustic waves (the returning echo) to smoothly return to the transducer for imaging.

Non-Limiting Example Data Acquisition and Image Processing.

Radio frequency signals received by an ultrasound probe may be post-processed. For imaging organs that are within 6 cm beneath the skin, including muscle, carotid artery, and jugular vein, a synthetic aperture imaging algorithm may be used. For applications that require a relatively high frame rate, such as the blood pressure measurement, a plane wave imaging mode may be used to increase the frame rate. A plane wave may be generated by applying flat delays to all elements of an ultrasound probe. The generated wave may insonify the whole area of interest. Plane wave imaging may provide for the acquisition of one full ultrasound image from a single shot.

For imaging organs that are deeper than 6 cm beneath the skin, including heart, lung, diaphragm, and stomach, a phased array harmonic imaging and spatial compounding algorithm may be used. Imaging algorithms may be adapted from the algorithm packages of commercial or research systems.

Calculation of Blood Pressure.

In some configurations, the systems and methods in accordance with the present disclosure may determine a blood pressure for a subject. By recording the continuous cross-sectional image of the blood vessel, its diameter may be determined to calculate the blood pressure waveform. The arterial blood pressure waveform p(t) may be determined by:

$$p(t) = p_d \cdot e^{\alpha\left(\frac{A(t)}{A_d}-1\right)} \quad (1)$$

where $p_d$ represents diastolic pressure, $A_d$ represents the diastolic arterial cross-section, A(t) represents the cross-sectional area of the artery as a function of time t, $\alpha$ represents the rigidity coefficient, and t is the time. Assuming that the artery is rotationally symmetrical, A(t) can be determined by:

$$A(t) = \frac{\pi d^2(t)}{4} \quad (2)$$

where d(t) is the diameter of the artery as a function of time t.

Assuming the human blood vessel is elastic with negligible viscoelasticity, the pressure-diameter curve may have a moderate hysteresis, below 0.2%. This may be suitable for subjects with normal local vascular conditions or with slight local atherosclerosis. The diameter of the vessel won't lag behind the pressure waveforms and the equation above can be used to reconstruct the accurate blood pressure waveforms from the vessel diameter waveforms.

The rigidity coefficient $\alpha$ can be determined by:

$$\alpha = \frac{A_d \ln(p_s/p_d)}{A_s - A_d} \quad (3)$$

where $A_s$ represents the systolic arterial cross-section, $A_d$ represents the diastolic arterial cross-section, $p_d$ represents diastolic pressure, and $p_s$ represents the systolic pressure which can be measured by a commercial blood pressure cuff. Using the aforementioned equations, the accurate pressure waveform p(t) can be achieved after a brief calibration for $\alpha$ and $p_d$.

A statistical analysis may be used to assess the statistical significance of any comparison studies. Data distribution may be assumed to be normal for all parametric tests. In a statistical analysis for comparison between multiple samples, one-way ANOVA followed by Tukey's multiple comparison test may be conducted. In non-limiting examples, the thresholds for statistical analyses may be *$p \leq 0.05$, $p \leq 0.01$, and *$p \leq 0.001$. In a statistical analysis between two data groups, a two-sample Student's t-test may be used, and the significance threshold may be placed at *$p \leq 0.05$, $p \leq 0.01$, and *$p \leq 0.001$.

Non-Limiting Example of an Adjustable BAUS

The adjustable BAUS includes multiple thin ultrasound probes for wearable imaging of multiple organs simultaneously and adjustable couplants for in situ tuning and optimizing the imaging directions. The adjustable BAUS couplant is enabled by a thermos-responsive, re-shapable, and tough hydrogel that robustly maintains its shape at normal skin temperatures and becomes re-moldable at elevated yet skin-tolerable temperatures (FIGS. 16-18E). The hydrogel is encapsulated by a bioadhesive elastomer that adheres to the skin and prevents dehydration of the adjustable BAUS couplant. Via the adjustable BAUS couplants, multiple thin rigid adjustable BAUS probes are adhered on various locations of the skin; each probe is adjusted toward an optimized imaging direction by re-shaping the adjustable BAUS couplants in situ on the skin. The adjustable BAUS probes are connected to and controlled by portable adjustable BAUS control units. The adjustable BAUS system demonstrates optimized, multi-directional, and multi-window imaging of multi-organ correlations in daily activities.

Figure 18A:
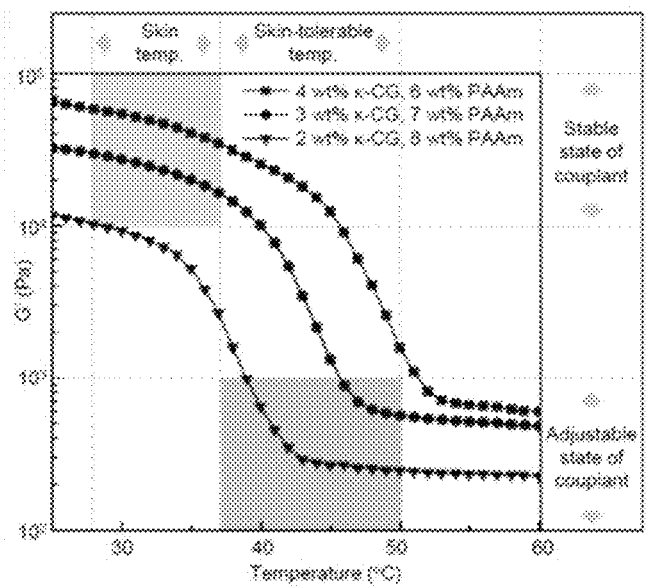
FIG. 18A shows the shear moduli of the κ-CG-PAAm hydrogels with different compositions (2 wt % of κ-CG, 8 wt % of PAAm; 3 wt % of κ-CG, 7 wt % of PAAm; 4 wt % of κ-CG, 6 wt % of PAAm) as they are cooled from 60° C. to 25° C.
Figure 18B:
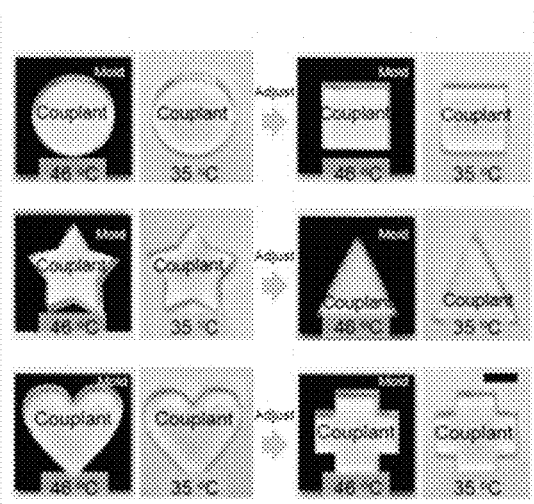
FIG. 18B shows the re-molding of the κ-CG-PAAm hydrogel (3 wt % of κ-CG, 7 wt % of PAAm) among various shapes by heating it to 45° C. and then cooling it to 35° C. FIGS.
Figure 18C:
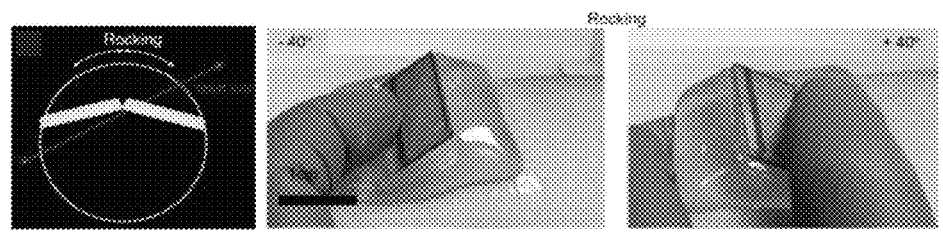
FIG. 18C shows rocking the wearable ultrasound probe by re-shaping the couplant to achieve optimized imaging directions.

In a non-limiting example, the adjustable BAUS couplant includes a thermo-responsive, re-shapable, and tough hydrogel composed of a first polymer network, a second polymer network, and water. The first polymer network is a polymer network with the thermal-transition property, and may include κ-Carrageenan (κ-CG), agarose, or gelatin. The second polymer network is a common hydrophilic polymer including polyacrylamide (PAAm), poly(vinyl alcohol), polyethylene glycol, poly(acrylic acid), poly(2-hydroxyethyl methacrylate), silicone, poly(N-isopropylacrylamide). In a non-limiting example, the adjustable BAUS couplant includes a thermo-responsive, re-shapable, and tough hydrogel composed of κ-CG-PAAm interpenetrating polymer networks (10 wt %) and water (90 wt %) as show in FIG. 17. The hydrogel is encapsulated by a thin bioadhesive elastomer membrane (thickness of <40 mm) of polyurethane to prevent dehydration of the hydrogel and to provide comfortable and stable adhesion on the skin (FIGS. 18A-18C). The hydrogel harnesses the thermal-transition property of κ-CG. At a normal skin temperature (28-37° C.), the hydrogel is in an elastic solid state, stably maintaining its shape on the skin. At an elevated yet skin-tolerable temperature (37-50° C.), the thermo-responsive hydrogel transits into a re-moldable state; this allows adjustment of the adjustable BAUS probe position and imaging direction by re-shaping the heated adjustable BAUS couplant on the skin. Once the optimized probe position and imaging direction are determined, the adjustable BAUS couplant cools down to a normal skin temperature and maintains its shape.

In a non-limiting example, the adjustable BAUS probe integrates a thin, rigid and high-performance ultrasound probe and an electric heater. The ultrasound probe has 96 piezoelectric elements with a central frequency of 4 or 10 MHz. The integrated electric heater can heat the adjustable BAUS couplant from a normal skin temperature (e.g., 35° C.) to an elevated yet skin-tolerable temperature (e.g., 50° C.) within 6 s for fast in situ adjustment of the adjustable BAUS probe's position on the skin. The adjustable BAUS probe has dimensions of 30 mm×10 mm×3 mm and a weight of 54 g; it can be comfortably adhered on various locations of the skin via the adjustable BAUS couplant.

Non-Limiting Example of Changing the Position of an Adjustable BAUS

Figure 18D:
FIG. 18D shows sweeping the wearable ultrasound probe by re-shaping the couplant to achieve optimized imaging directions.
Figure 18E:
FIG. 18E shows rotating the wearable ultrasound probe by re-shaping the couplant to achieve optimized imaging directions.

To evaluate the adjustable capability of the adjustable BAUS couplant, the shear modulus of the κ-CG-PAAm hydrogel with an optimized composition (3 wt % of κ-CG, 7 wt % of PAAm) was measured as it cools down from 60° C. to 27° C. When the temperature of the hydrogel is at an elevated yet skin-tolerable temperature (45-50° C.), the shear modulus of the hydrogel is below 1 kPa (FIG. 18A), which allows re-molding of the hydrogel among various shapes (FIG. 18B). As the temperature of the hydrogel reduced to a normal skin temperature (27-37° C.), the hydrogel is frozen in the re-molded shape (FIG. 18B) and the shear modulus of the hydrogel increases above 10 kPa (FIG. 18A). The hydrogel at a normal skin temperature (27-37° C.) can also elastically recover its shape after large deformations. The adjustable BAUS couplant with the optimized composition enables in situ adjustment of ultrasound imaging directions by rocking, sweeping, and/or rotating the adjustable BAUS probe and re-shaping the adjustable BAUS couplant at the elevated yet skin-tolerable temperature (FIGS. 18C-18E). Once an optimized imaging direction is determined, the re-shaped adjustable BAUS couplant is cooled down to the skin temperature and frozen in its adjusted shape.

Non-Limiting Example of Evaluating Acoustic Performance of the Adjustable BAUS

To evaluate the acoustic performance of the adjustable BAUS couplant, the transmission through method was used to measure the attenuation coefficients of the adjustable BAUS couplant before and after shape adjustment (e.g., by uniaxially stretching the couplant two times). At frequencies from 1 to 10 MHz, the attenuation coefficients of the adjustable BAUS couplant before and after adjustment were measured to be from 0.064 to 0.133 dB/mm and 0.066 to 0.116 dB/mm, respectively. The acoustic impedance of the adjustable BAUS couplant was further measured to be 1.59 MRayl, which matches the acoustic impedance of the skin. In comparison, typical liquid and solid hydrogel couplants have similar attenuation coefficients as those of the adjustable BAUS couplant at frequencies from 1 to 10 MHz: 0.057 to 0.120 dB/mm and 0.102 to 0.173 dB/mm, respectively. However, the attenuation coefficients of typical elastomer couplants are multiple times higher than that of the adjustable BAUS couplant at the same frequency. In addition, typical solid hydrogel and elastomer couplants cannot re-mold their shapes on the skin; typical liquid hydrogel couplants cannot maintain their shapes under pressures from ultrasound probes.

Non-Limiting Example of Image Direction of Adjustable BAUS

Figure 16:
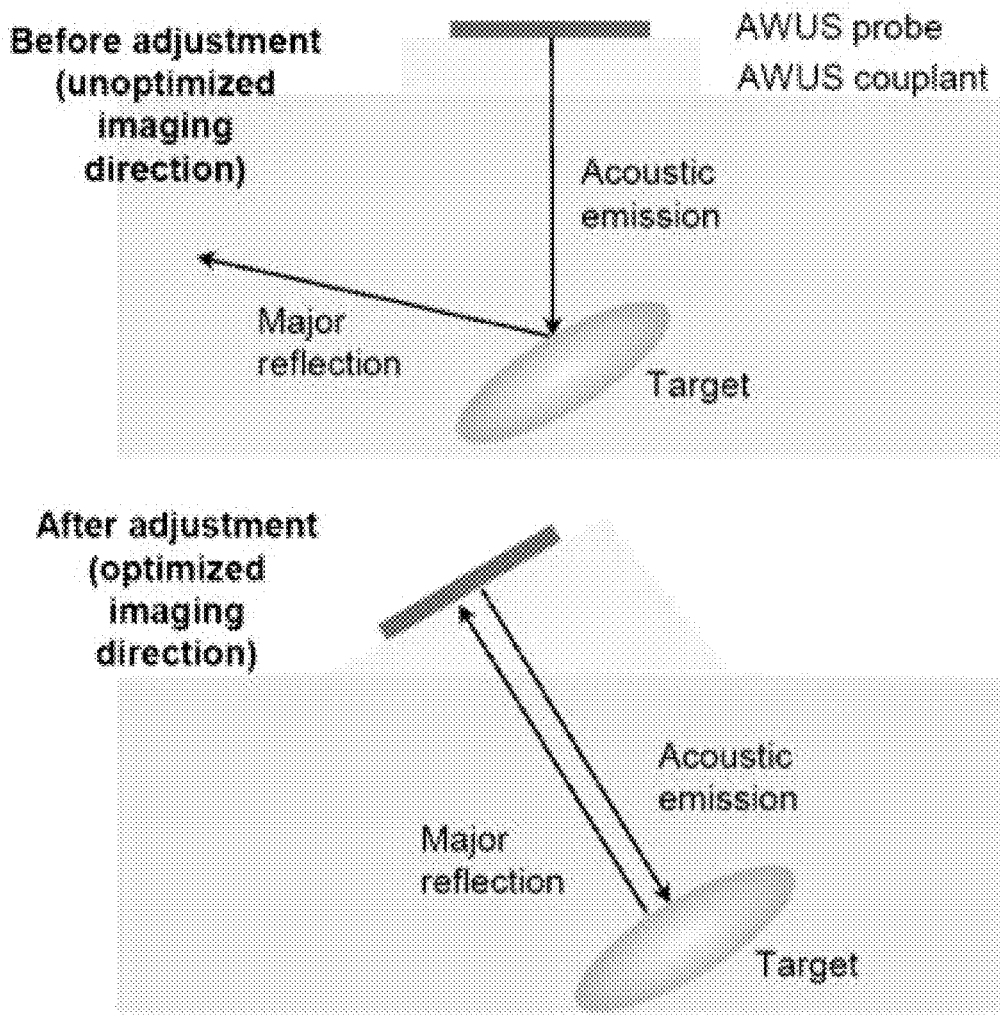
FIG. 16 is a schematic of a non-limiting example of adjusting a wearable ultrasound system on a surface. The ultrasound system includes multiple thin ultrasound probes for wearable imaging of multiple organs and re-shapable ultrasound couplant for in situ tuning of imaging directions. In the top view, the imaging direction of the wearable ultrasound probe is unoptimized before adjustment. In the bottom view, an optimized imaging direction is achieved by re-shaping the wearable ultrasound probe on the skin.
Figure 17:
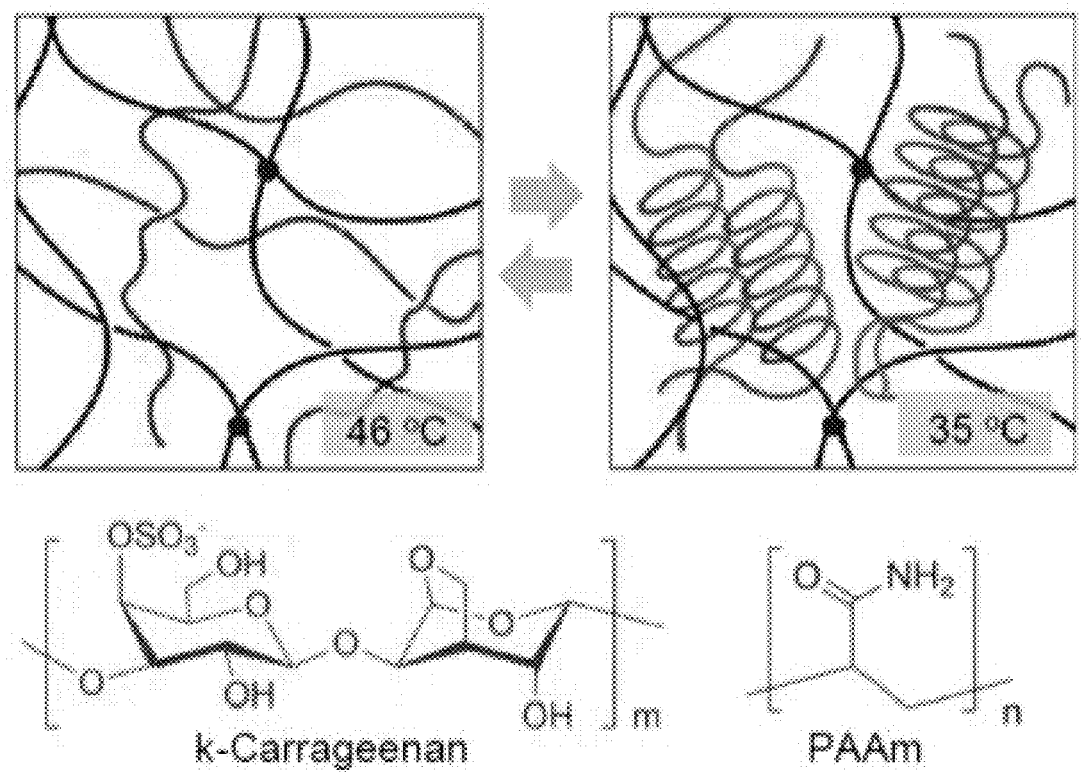
FIG. 17 is a non-limiting example of couplant material made of a thermos-responsive hydrogel composed of κ-carrageenan-polyacrylamide (κ-CG-PAAm) interpenetrating polymer networks and water. At 45° C., the hydrogel can be re-shaped; at 35° C., the hydrogel is elastic and maintains its shape.
Figure 19A:
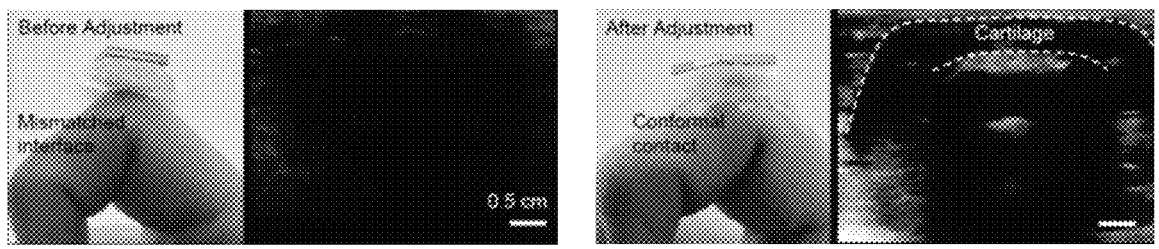
FIG. 19A shows photographs and ultrasound scans comparing the imaging performances of a finger joint of a non-limiting example of a wearable ultrasound system before and after adjustment.
Figures 19B, 19C:
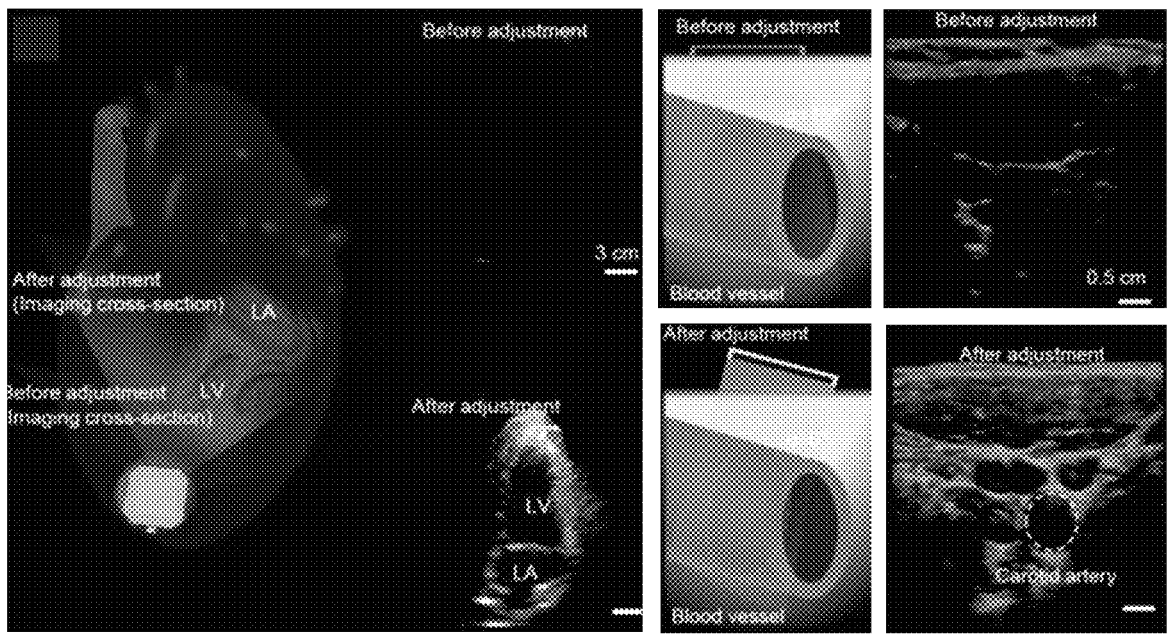
FIG. 19B shows a schematic and ultrasound scans comparing the imaging performances of the heart of a non-limiting example of a wearable ultrasounds ultrasound system before and after adjustment.
FIG. 19C shows schematics and ultrasound scans comparing the imaging performances of a carotid artery of a non-limiting example of a wearable ultrasound system before and after adjustment.
Figure 19D:
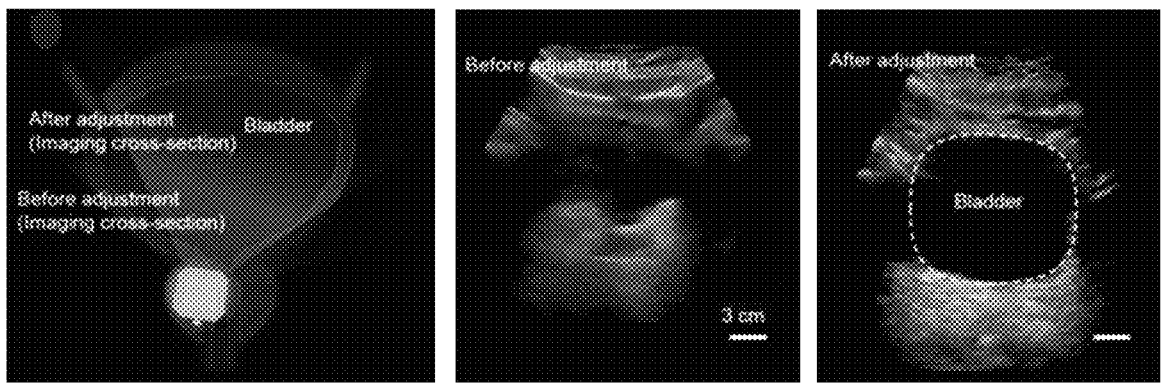
FIG. 19D shows a schematic and ultrasound scans comparing the imaging performances of a bladder of a non-limiting example of a wearable ultrasound system before and after adjustment.

To demonstrate the adjustable BAUS couplant's capability to provide optimized imaging directions, the adjustable BAUS probe was adhered to various locations of the body via a flat adjustable BAUS couplant, so that the adjustable BAUS probe was initially parallel to the skin. Because most biological interfaces such as organ walls are not parallel to the skin, the unadjusted imaging directions are usually unoptimized (FIG. 16). Therefore, before adjusting the imaging direction, the ultrasound images of various tissues and organs including finger joint, heart, carotid artery, bladder, liver, muscle, stomach, lung, and kidney were blurry and lacked details (FIGS. 19A-19D). Once the adjustable BAUS probe was adjusted to achieve the optimized imaging direction by re-shaping the adjustable BAUS couplant, the ultrasound images obtained by the same system were dramatically enhanced. For example, the adjustable BAUS couplant was re-molded around a finger joint after adjustment to give substantially improved imaging quality (FIG. 19A). The adjustable BAUS probe on the chest was tilted by an angle of 30 to 60 degrees after adjustment to give optimized imaging directions for 2-chamber view (FIG. 19B) of the heart. The adjustable BAUS probe on the neck was tilted by angle of 15 degrees after adjustment to achieve an optimized direction for imaging the carotid artery (FIG. 19C).

Non-Limiting Example of the Simultaneous Multi-Window Imaging of the Adjustable BAUS The adjustable BAUS system's capability of simultaneous multi-window imaging of multi-organ correlations was demonstrated including diaphragm-heart-jugular vein, stomach-bladder, and muscle-brachial artery correlations in daily activities (FIGS. 20A-20D). Multiple adjustable BAUS probes were adhered to multiple locations of the skin via adjustable BAUS couplants and then the probe positions were adjusted in situ to achieve the optimized imaging directions.

Figure 20A:
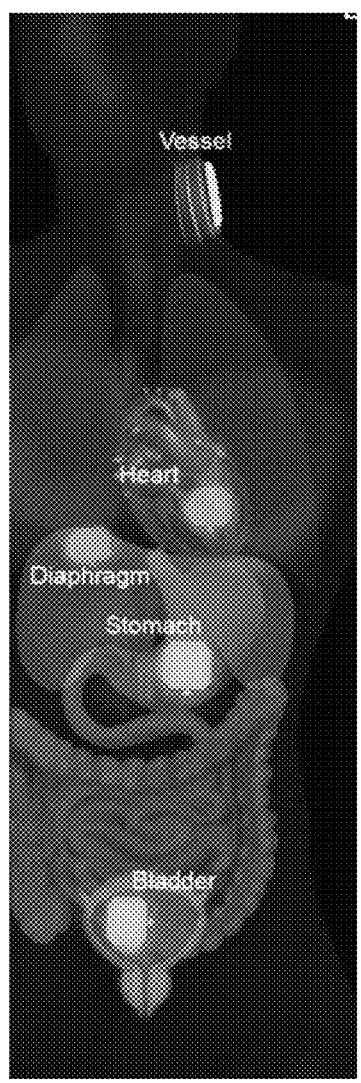
FIG. 20A shows schematics of the locations of the wearable ultrasound probes on the skin.
Figure 20B:
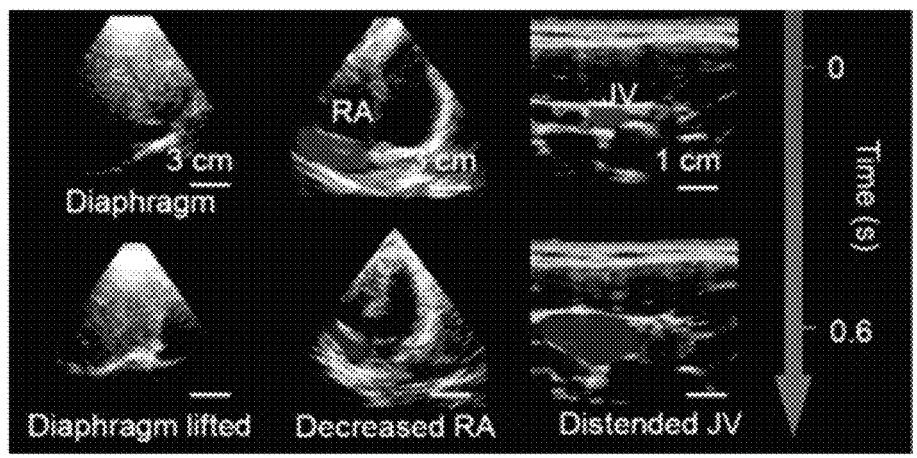
FIG. 20B shows a diaphragm-right atrium-jugular vein correlation when a subject lifted up the diaphragm.
Figure 20C:
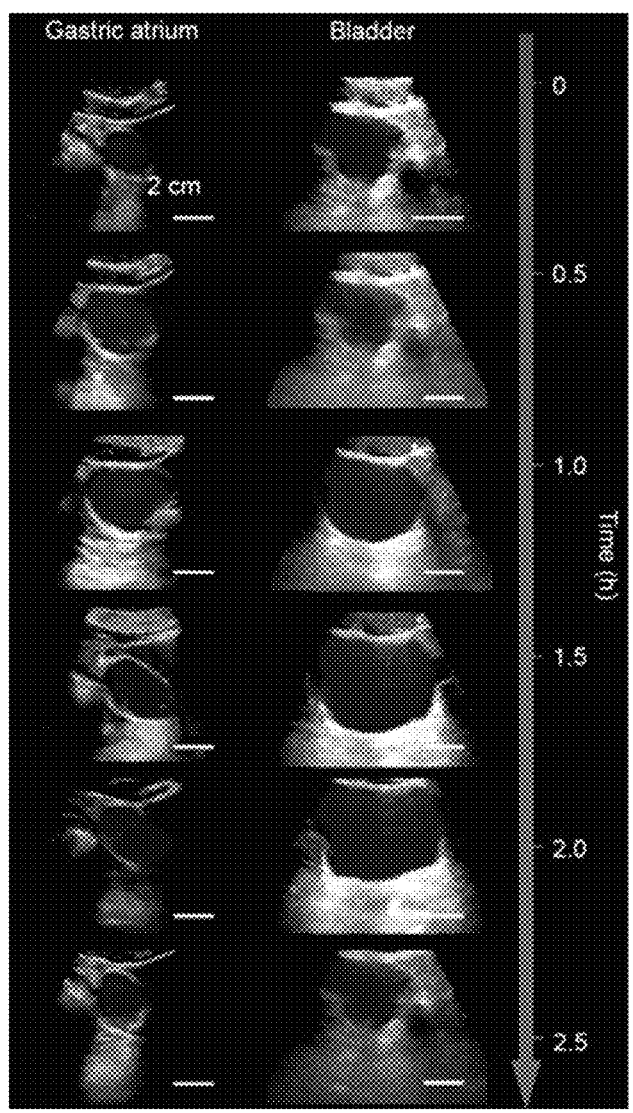
FIG. 20C shows stomach-bladder correlation when a subject drank 500 ml of water.

FIGS. 20A-20C give the correlations among the diaphragm, heart, and blood vessels. The adjustable BAUS system was used to simultaneously image the diaphragm, right atrium, and jugular vein of a subject. In the baseline state, the diaphragm, right atrium and jugular vein of the subject were all observed to function normally (FIG. 20B). Thereafter, the subject suddenly lifted up the diaphragm to compress the right atrium. The adjustable BAUS system spontaneously imaged a decreased volume of the right atrium and an extended area of the jugular vein because the compressed right atrium caused an increase in the pressure of blood flowing into the pulmonary artery, which subsequently caused an increase in the pressure of blood flowing into the jugular vein. The increased pressure in the jugular vein led to an extended area of the jugular vein observed in the BAUS image. These findings provide valuable information for understanding the mechanical interplay among the diaphragm, heart and blood vessels, and have significant implications for the diagnosis and monitoring of respiratory and cardiovascular disorders.

Figure 20D:
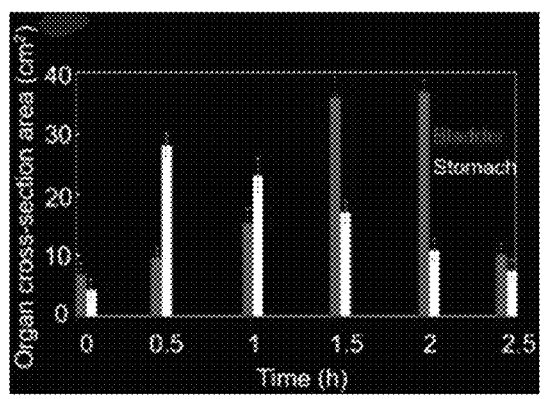
FIG. 20D shows quantified cross-section areas of the stomach and bladder by segmenting the time series wearable ultrasound images in FIG. 20C.

FIGS. 20C and 20D give the correlation between the stomach and bladder simultaneously imaged by the adjustable BAUS system over a few hours. At the time 0, both the stomach and bladder were at the baseline states. After the subject ingested 500 ml of water at the time of 0.5 hours, the stomach expanded immediately and then gradually decreased its volume to the baseline state over the next 2 hours due to absorbing and passing the water. Correspondingly, the bladder was gradually filled with urine and increased its volume. At the time of 2.5 hours, the subject urinated and the bladder returned to the baseline state. In a non-limiting example, a deep-learning algorithm MOSNet further segmented the time-series ultrasound images of the stomach and bladder to quantify their cross-section areas (FIG. 20D). The quantified results (FIG. 20D) are consistent with the ultrasound images of the stomach-bladder correlation (FIG. 20C). This finding demonstrates the capability of the adjustable BAUS system to capture the physiological relation between the stomach and bladder, providing valuable insights into human digestive and urinary systems.

The human body is a complex system with multiple organs that interact with one another over the long term. Existing handheld and wearable ultrasound devices mostly give short-term imaging of individual organs at a time via a single ultrasound probe. The portable adjustable BAUS system may simultaneously image most organs (that are amendable to ultrasound imaging) of a free-moving subject over days via multiple adjustable BAUS probes. Each adjustable BAUS probe is further adjusted to the optimized imaging direction for high wearable imaging performances. The obtained long-term time-series imaging data of multi-organ correlations could provide a new system-level insight into human physiology. The adjustable BAUS system could also provide multi-window imaging, monitoring, and diagnostic tools for various diseases.

The present disclosure has described one or more preferred embodiments, and it should be appreciated that many equivalents, alternatives, variations, and modifications, aside from those expressly stated, are possible and within the scope of the invention.

The invention claimed is:

1. A system for extended ultrasound imaging of a subject, comprising:
an ultrasound probe formed of a plurality of transducers arranged across a plane;
an acoustically transmissible couplant, comprising:
an elastomer membrane extending across and coupled to the plane of the ultrasound probe;
a hydrogel arranged within the elastomer membrane configured to conform to a surface of the subject;
a bioadhesive layer configured to provide a removable fixed coupling to the surface of the subject coupled to the elastomer membrane on a side opposite to the ultrasound probe and configured to couple the elastomer membrane to the subject; and
a heater removably coupled to the acoustically transmissible couplant.

2. The system of claim 1, wherein the heater is configured to heat the hydrogel to adjust a position of the ultrasound probe fixedly coupled to the surface of the subject.

3. A method for forming an extended ultrasound imaging system of a subject, comprising:
forming an ultrasound probe with a plurality of transducers arranged across a plane;
forming an acoustically transmissible couplant, comprising:
extending an elastomer membrane across and coupled to the plane of the ultrasound probe;
arranging a hydrogel within the elastomer membrane configured to conform to a surface of the subject; and
forming a bioadhesive layer configured to provide a fixed coupling to the surface of the subject coupled to the elastomer membrane on a side opposite to the ultrasound probe and configured to couple the elastomer membrane to the subject; and
coupling a removable heater to the acoustically transmissible couplant.

4. The method of claim 3, wherein the heater is configured to heat the hydrogel to adjust a position of the ultrasound probe fixedly coupled to the surface of the subject.

5. A system for forming a multi-window, simultaneous, extended ultrasound imaging of a subject through coordinated operation, comprising:
multiple ultrasound probes,
wherein each ultrasound probe is formed of a plurality of transducers arranged across a plane;
wherein each ultrasound probe includes an acoustically transmissible couplant, comprising:
an elastomer membrane extending across and coupled to the plane of each ultrasound probe;
a hydrogel arranged within the elastomer membrane configured to conform to a surface of the subject;
a bioadhesive layer configured to provide a fixed coupling to the surface of the subject coupled to the elastomer membrane on a side opposite to each ultrasound probe and configured to couple the elastomer membrane to the subject,
a heater removably coupled to the acoustically transmissible couplant; and
a processor configured to receive imaging data from each ultrasound probe and determine a correlation between the imaging data from each ultrasound probe.

6. The system of claim 5, wherein each of the multiple ultrasound probes are positioned on different locations of the subject and configured to image different organs of the subject and the processor determines the correlation between the different organs.

7. The system of claim 2, wherein the position of the ultrasound probe is adjusted by one of rocking, sliding, and twisting to improve ultrasound imaging of a target structure of the subject.

8. The system of claim 1, wherein the hydrogel includes a material that are polymer networks infiltrated with water, and contains at least one of: polyacrylic acid and its derivatives, polymethacrylic acid and its derivatives, polyacrylamide and its derivatives, polyvinyl alcohol and its derivatives, polyethylene glycol and its derivatives, polyurethane and its derivatives, latex and its derivatives, nature rubber, polydimethylsiloxane and its derivatives, casein and its derivatives, albumin and its derivatives, gelatin and its derivatives, collagen and its derivatives, chitosan and its derivatives, hyaluronic acid and its derivatives, alginate and its derivatives, fibrin and its derivatives, agarose and its derivatives, oxidized alginate and its derivatives, cellulose and its derivatives, oxidized cellulose and its derivatives, or κ-Carrageenan and its derivatives.

9. The system of claim 8, wherein the hydrogel includes at least one of chemical or physical crosslinkers.

10. The system of claim 9, wherein the chemical crosslinkers include at least one of: gelatin methacrylate, gelatin acrylate, gelatin N-hydroxysuccinimide, gelatin maleimide, hyaluronic acid methacrylate, hyaluronic acid acrylate, hyaluronic acid N-hydroxysuccinimide, hyaluronic acid maleimide, oxidized methacrylic alginate, oxidized acrylic alginate, alginate N-hydroxysuccinimide, alginate maleimide, polycaprolactone dimethacrylate, fibrin methacrylate, fibrin acrylate, fibrin N-hydroxysuccinimide, fibrin maleimide, collagen methacrylate, collagen acrylate, collagen N-hydroxysuccinimide, collagen maleimide, agarose methacrylate, agarose acrylate, agarose N-hydroxysuccinimide, agarose maleimide, cellulose methacrylate, cellulose acrylate, cellulose N-hydroxysuccinimide, cellulose maleimide, chitosan methacrylate, chitosan acrylate, chitosan N-hydroxysuccinimide, chitosan maleimide, polycaprolactone diacrylate, polycaprolactone dimethacrylate, polycaprolactone di N-hydroxysuccinimide, polycaprolactone dimaleimide, dipic acid dihydrazide, N,N'-bis(acryloyl) cystamine, N,N'-methylenebis(acrylamide), polyvinyl alcohol, Genipin, Glutaraldehyde, glyoxal, ethylene glycol dimethacrylate, N,O-bismethacryloyl ethanolamine, divinylbenzene, trimethylolpropane trimethacrylate, pentaerythritol triacrylate, pentaerythritol tetraacrylate, 1,3-diisopropenyl benzene, glycidyl methacrylate, 2,6-bisacryloylamidopyridine, 3,5-bis(acryloadmido)benzoic acid, 1,4-diacryloyl piperazine, acrylic cyclodextrin (CD), methacrylic cyclodextrin (CD), acrylic cucurbit[n]uril, methacrylic cucurbit[n]uril, polyethylene glycol diacrylate, polyethylene glycol dimethacrylate, polyethylene glycol di N-hydroxysuccinimide, polyethylene glycol dimaleimide, multi-arm polyethylene glycol acrylate, multi-arm polyethylene glycol methacrylate, multi-arm polyethylene glycol N-hydroxysuccinimide, or multi-arm polyethylene glycol maleimide.

11. The system of claim 1, wherein the elastomer membrane includes a material that is at least one of: natural rubbers, latex, styrene-butadiene block copolymers, polyisoprene, isoprene, polybutadiene, ethylene-propylene rubber, ethylene propylene diene rubber, silicone elastomers, fluoroelastomers, polyurethane elastomers, polyurethane, isobutyleneisoprene, chloroprene, nitrilebutadiene or nitrile rubbers.

12. The system of claim 1, wherein the elastomer membrane maintains a hydration level of the hydrogel.

13. The system of claim 1, wherein the elastomer membrane and the hydrogel are bonded so that there is no delamination, gap, or air bubble between them under deformation and forces.

14. The system of claim 1, wherein at least one of the elastomer membrane, the hydrogel, or the bioadhesive layer are configured to promote penetration of ultrasound energy into the subject.

15. The system of claim 14, wherein the bioadhesive layer includes a material that is at least one of: animal glue, casein glue, starch, dextrin, agar, algin, gum arabic, epoxy resins, nitrocellulose, polyvinyl acetate, vinyl acetate-ethylene copolymer, polyethylene, polypropylene, polyamides, polyesters, polyacrylics, polycyanoacrylics, polyethylenimine, natural rubber, butyl rubber, butadiene rubber, styrene-butadiene rubber, nitrile rubber, silicone, or neoprene.

16. The system of claim 1, further forming a multi-window, simultaneous, extended ultrasound imaging system through coordinated operation with at least one of:
 a second ultrasound probe formed of a second plurality of transducers arranged across a plane of the second ultrasound probe;
 a second elastomer membrane extending across and coupled to the plane of the second ultrasound probe;
 a second hydrogel arranged within the second elastomer membrane; and
 a second bioadhesive layer coupled to the elastomer membrane on a side opposite to the second ultrasound probe and configured to couple the second elastomer membrane to the subject.

17. The system of claim 1, wherein a total thickness of the elastomer membrane and the bioadhesive layer is less than ¼ the ultrasound wavelength of the ultrasound probe based on a center frequency of the ultrasound probe.

18. The system of claim 17, wherein the center frequency of the ultrasound probe ranges from 1 to 10 MHz.

19. The method of claim 4, wherein the position of the ultrasound probe is adjusted by one of rocking, sliding, and twisting to improve ultrasound imaging of a target structure of the subject.

20. The method of claim 3, wherein the hydrogel includes a material that is at least one of: polyacrylic acid and its derivatives, polymethacrylic acid and its derivatives, polyacrylamide and its derivatives, polyvinyl alcohol and its derivatives, polyethylene glycol and its derivatives, polyurethane and its derivatives, latex and its derivatives, nature rubber, polydimethylsiloxane and its derivatives, casein and its derivatives, albumin and its derivatives, gelatin and its derivatives, collagen and its derivatives, chitosan and its derivatives, hyaluronic acid and its derivatives, alginate and its derivatives, fibrin and its derivatives, agarose and its derivatives, oxidized alginate and its derivatives, cellulose and its derivatives, oxidized cellulose and its derivatives, or κ-Carrageenan and its derivatives.

21. The method of claim 20, wherein the hydrogel includes at least one of chemical or physical crosslinkers.

22. The method of claim 21, wherein the chemical crosslinkers include at least one of: gelatin methacrylate, gelatin acrylate, gelatin N-hydroxysuccinimide, gelatin maleimide, hyaluronic acid methacrylate, hyaluronic acid acrylate, hyaluronic acid N-hydroxysuccinimide, hyaluronic acid maleimide, oxidized methacrylic alginate, oxidized acrylic alginate, alginate N-hydroxysuccinimide, alginate maleimide, polycaprolactone dimethacrylate, fibrin methacrylate, fibrin acrylate, fibrin N-hydroxysuccinimide, fibrin maleimide, collagen methacrylate, collagen acrylate, collagen N-hydroxysuccinimide, collagen maleimide, agarose methacrylate, agarose acrylate, agarose N-hydroxysuccinimide, agarose maleimide, cellulose methacrylate, cellulose acrylate, cellulose N-hydroxysuccinimide, cellulose maleimide, chitosan methacrylate, chitosan acrylate, chitosan N-hydroxysuccinimide, chitosan maleimide, polycaprolactone diacrylate, polycaprolactone dimethacrylate, polycaprolactone di N-hydroxysuccinimide, polycaprolactone dimaleimide, dipic acid dihydrazide, N,N'-bis(acryloyl) cystamine, N,N'-methylenebis(acrylamide), polyvinyl alcohol, Genipin, Glutaraldehyde, glyoxal, ethylene glycol dimethacrylate, N,O-bismethacryloyl ethanolamine, divinylbenzene, trimethylolpropane trimethacrylate, pentaerythritol triacrylate, pentaerythritol tetraacrylate, 1,3-diisopropenyl benzene, glycidyl methacrylate, 2,6-bisacryloylamidopyridine, 3,5-bis(acryloadmido)benzoic acid, 1,4-diacryloyl piperazine, acrylic cyclodextrin (CD), methacrylic cyclodextrin (CD), acrylic cucurbit[n]uril, methacrylic cucurbit[n]uril, polyethylene glycol diacrylate, polyethylene glycol dimethacrylate, polyethylene glycol di N-hydroxysuccinimide, polyethylene glycol dimaleimide, multi-arm polyethylene glycol acrylate, multi-arm polyethylene glycol methacrylate, multi-arm polyethylene glycol N-hydroxysuccinimide, or multi-arm polyethylene glycol maleimide.

23. The method of claim 3, wherein arranging the hydrogel within the elastomer membrane includes arranging the hydrogel within the elastomer membrane including a material that is at least one of: natural rubbers, latex, styrene-butadiene block copolymers, polyisoprene, isoprene, polybutadiene, ethylene-propylene rubber, ethylene propylene diene rubber, silicone elastomers, fluoroelastomers, polyurethane elastomers, polyurethane, isobutyleneisoprene, chloroprene, nitrilebutadiene or nitrile rubbers.

24. The method of claim 3, wherein arranging the hydrogel within the elastomer membrane includes arranging the hydrogel within the elastomer membrane maintaining a hydration level of the hydrogel.

25. The method of claim 3, further comprising bonding the elastomer membrane and the hydrogel against delamination, gap, or air bubble formation under deformation and forces.

26. The method of claim 3, wherein at least one of arranging hydrogel within the elastomer membrane, or forming the bioadhesive layer are configured to promote penetration of ultrasound energy into the subject.

27. The method of claim 26, wherein the bioadhesive layer includes a material that is at least one of: animal glue, casein glue, starch, dextrin, agar, algin, gum arabic, epoxy resins, nitrocellulose, polyvinyl acetate, vinyl acetate-ethylene copolymer, polyethylene, polypropylene, polyamides, polyesters, polyacrylics, polycyanoacrylics, polyethylenimine, natural rubber, butyl rubber, butadiene rubber, styrene-butadiene rubber, nitrile rubber, silicone, or neoprene.

* * * * *